(12) United States Patent
Hudson

(10) Patent No.: US 8,591,449 B2
(45) Date of Patent: Nov. 26, 2013

(54) VESSEL FOR STORING FLUID AT A CONSTANT PRESSURE ACROSS A RANGE OF INTERNAL DEFORMATIONS

(76) Inventor: Dennis Sheanne Hudson, Albuquerque, NM (US)

(*) Notice: Subject to any disclaimer, the term of this patent is extended or adjusted under 35 U.S.C. 154(b) by 208 days.

(21) Appl. No.: 12/907,008

(22) Filed: Oct. 18, 2010

(65) Prior Publication Data

US 2012/0095382 A1  Apr. 19, 2012

(51) Int. Cl.
*A61M 1/14* (2006.01)
*B60C 23/10* (2006.01)
*F16L 55/04* (2006.01)

(52) U.S. Cl.
USPC ............. 604/6.16; 422/45; 138/130; 152/418

(58) Field of Classification Search
USPC ........ 604/6.16, 10, 9; 422/45; 138/30, 31, 28; 152/418; 210/645, 646, 647
See application file for complete search history.

(56) References Cited

U.S. PATENT DOCUMENTS

| | | | |
|---|---|---|---|
| 1,781,541 A | 11/1930 | Einstein et al. | |
| 4,293,961 A | 10/1981 | Runge | |
| 4,619,467 A | 10/1986 | Lafferty | |
| 4,651,792 A | 3/1987 | Taylor | |
| 4,798,398 A | 1/1989 | Cummins | |
| 5,052,712 A | 10/1991 | Raidel | |
| 5,246,247 A | 9/1993 | Runkel | |
| 5,556,489 A | 9/1996 | Curlett et al. | |
| 5,813,141 A | 9/1998 | Cho | |
| 6,338,207 B1 | 1/2002 | Chang | |
| 6,508,621 B1 | 1/2003 | Zeighami et al. | |
| 6,910,484 B1* | 6/2005 | Skog | 128/205.18 |
| 7,469,527 B2 | 12/2008 | Negre et al. | |
| 7,578,662 B1 | 8/2009 | Ibragimov | |
| 7,806,095 B2 | 10/2010 | Cook et al. | |
| 2008/0305386 A1 | 12/2008 | Havel et al. | |

OTHER PUBLICATIONS

U.S. Appl. No. 12/841,168, Hudson.

* cited by examiner

*Primary Examiner* — Jackie Ho
*Assistant Examiner* — Mark Wardas

(57) ABSTRACT

A device for storing and dispensing a fluid and fluid energy using continuous analog modification of the total surface area of one or more solid surfaces against which, on one side of such surface(s), the fluid to be stored and dispensed may proximally and forcibly act and against which, on the opposed side of such surface(s), one or more elastic elements may act, withal producing the effect of a substantially constant static pressure across a range of deformation of the elastic element(s), i.e., a piezoequilibrative effect.

19 Claims, 31 Drawing Sheets

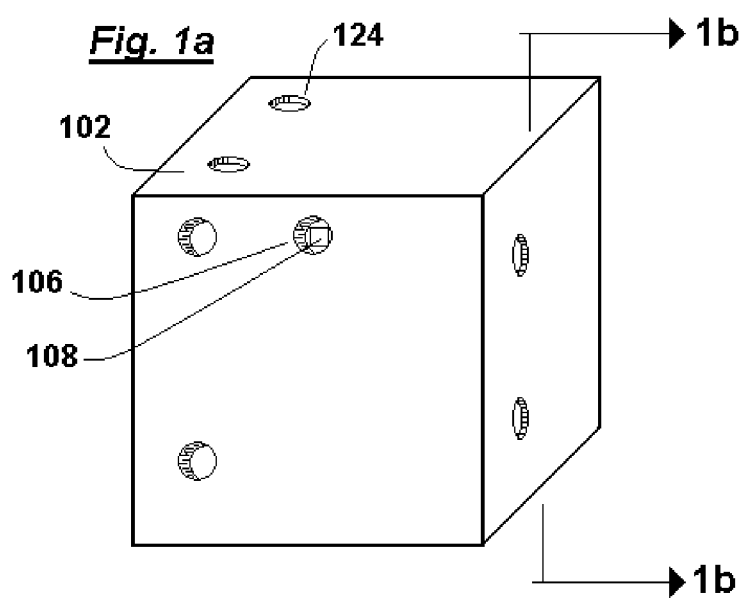

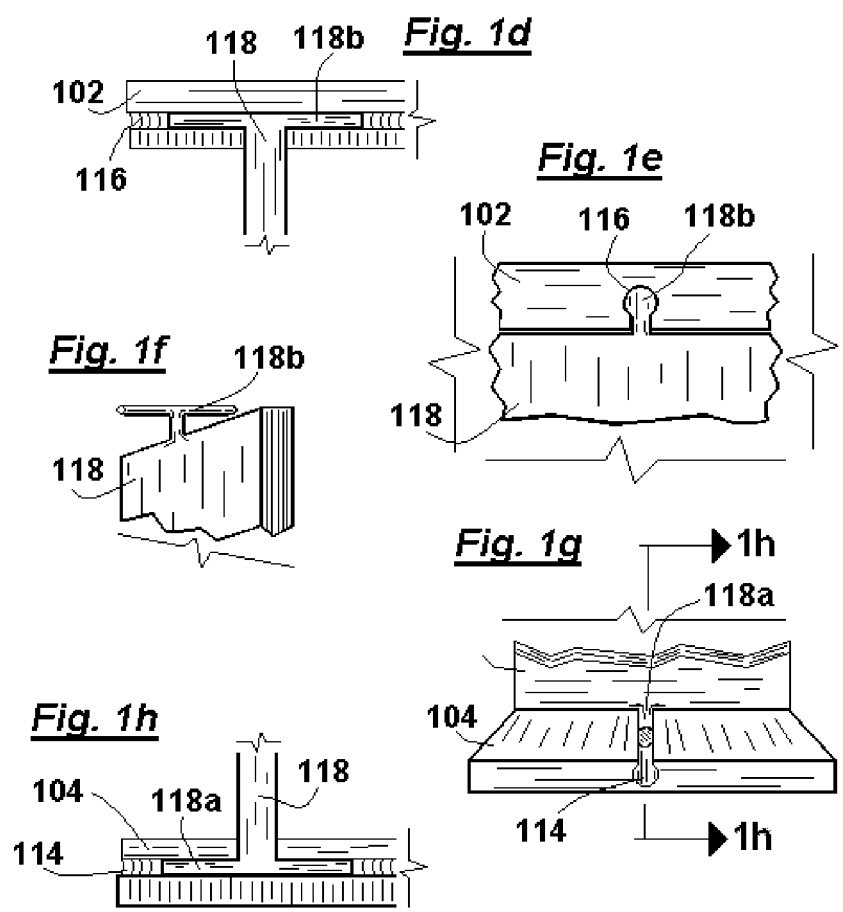

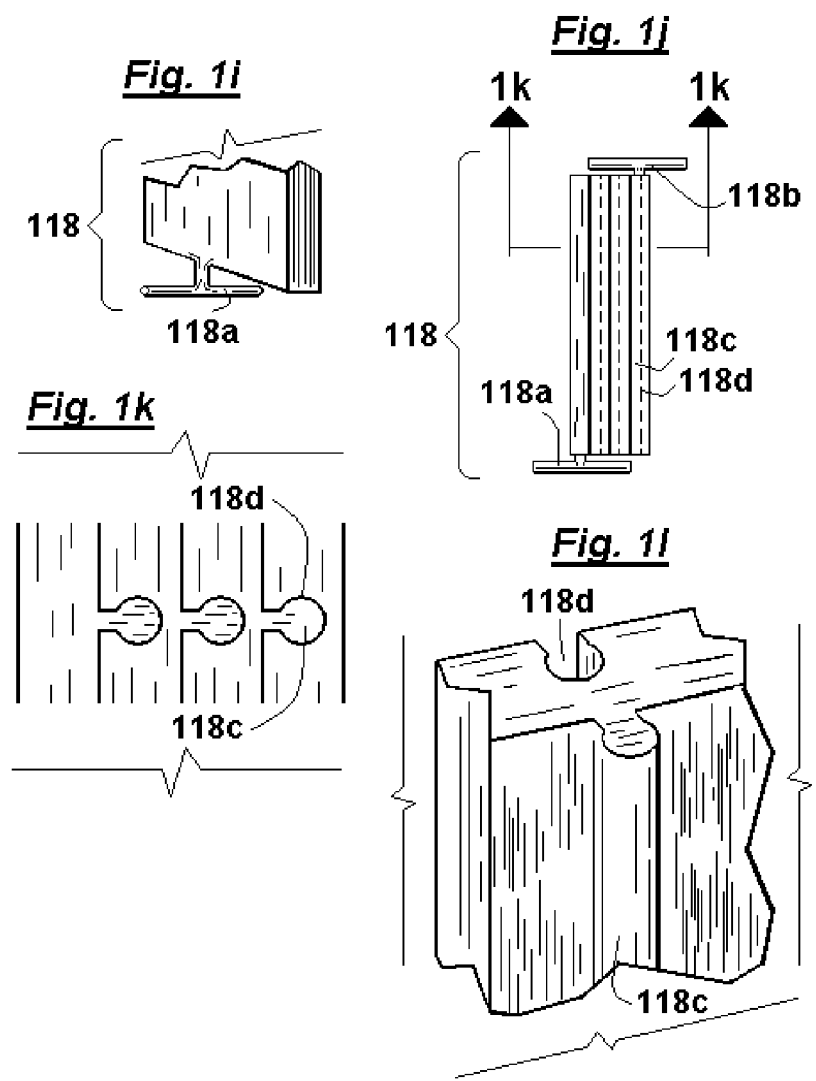

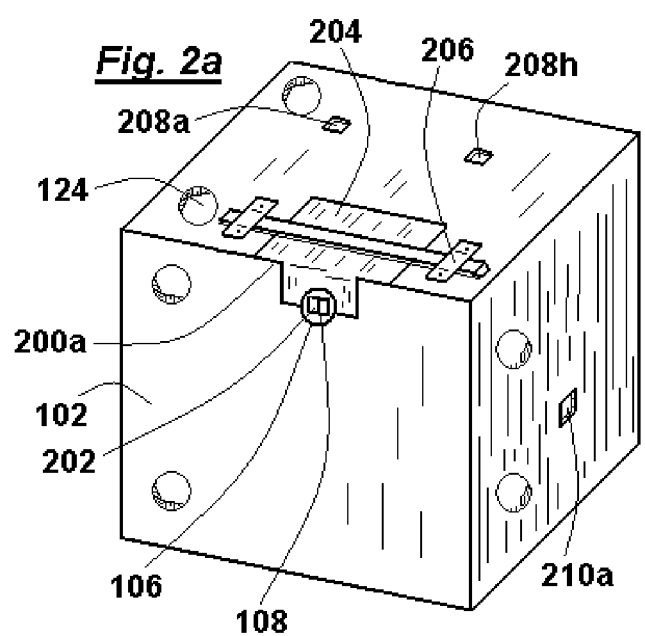

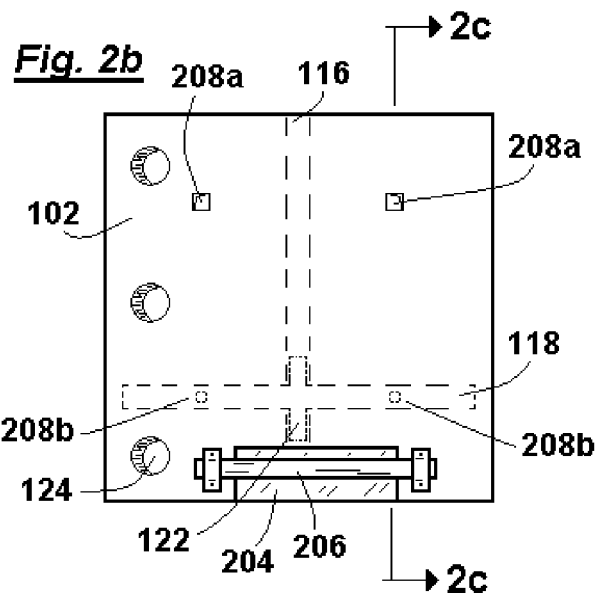
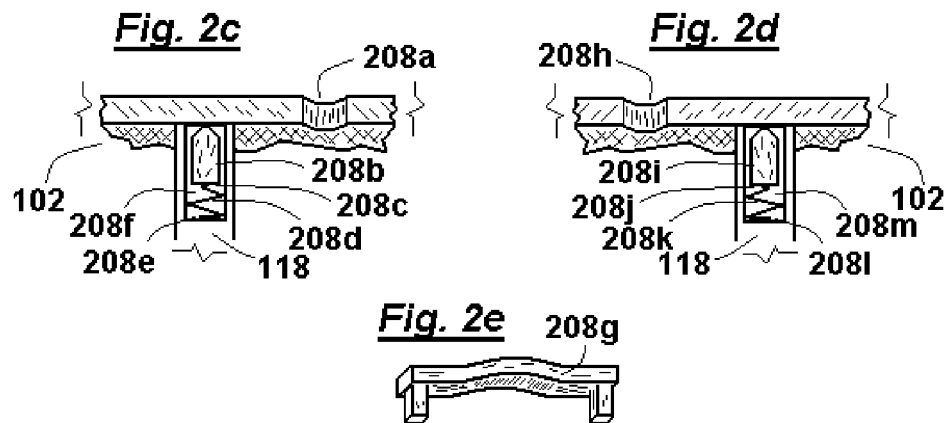

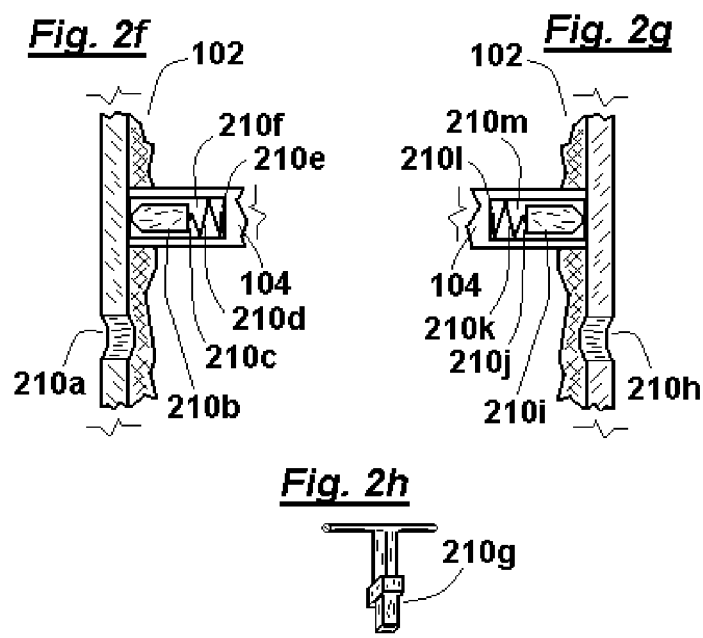

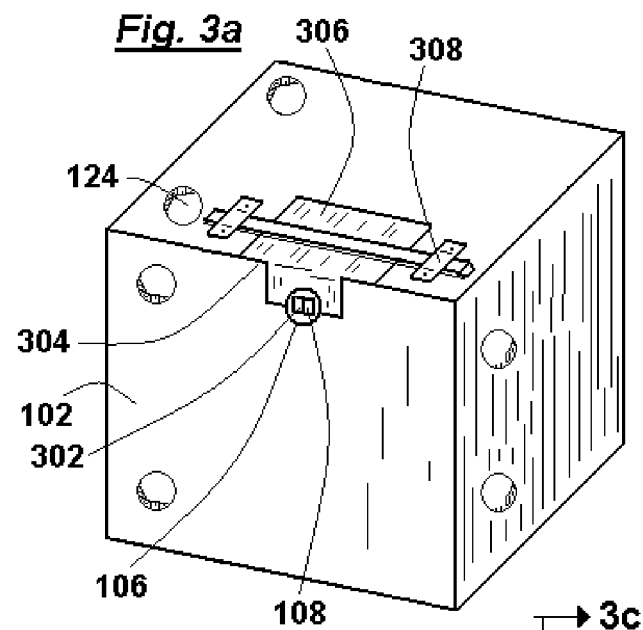
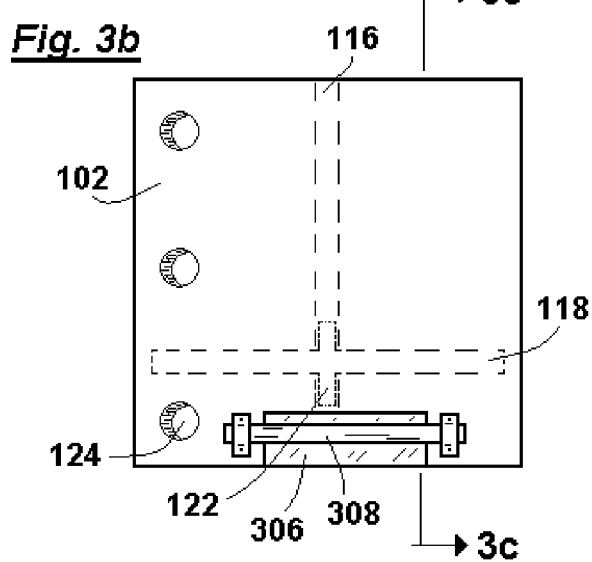

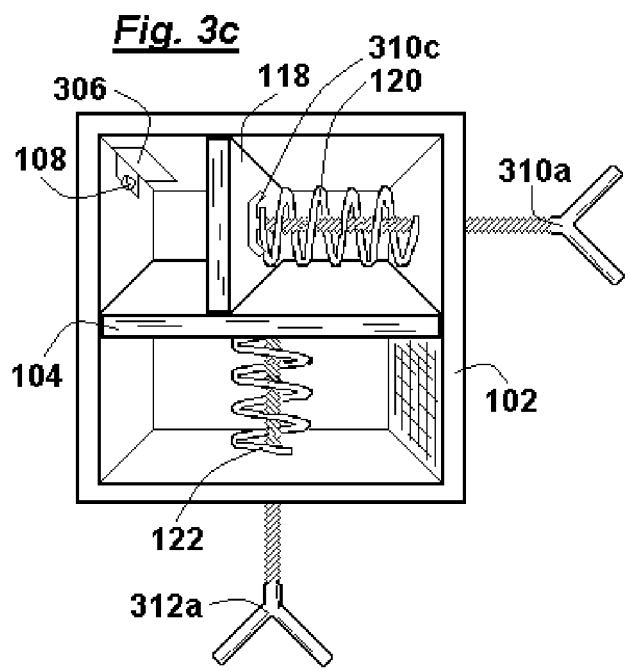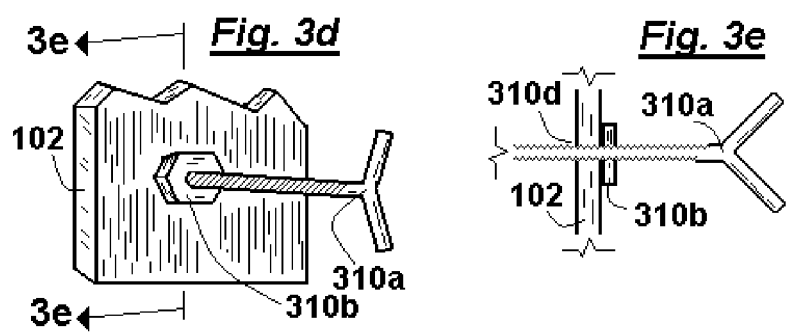

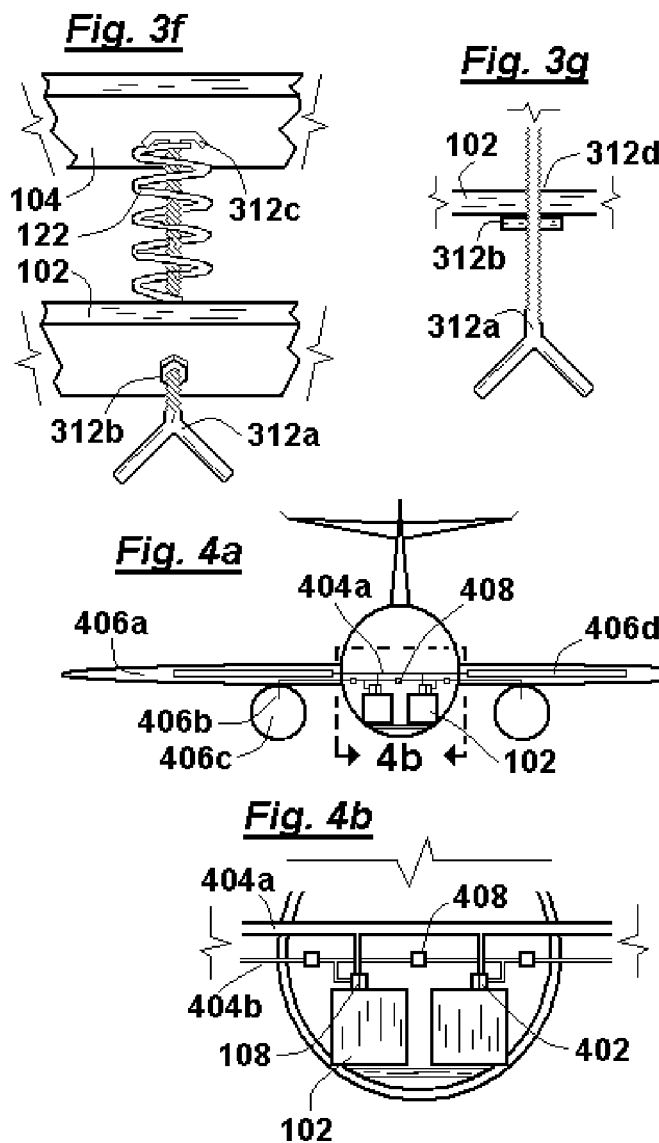

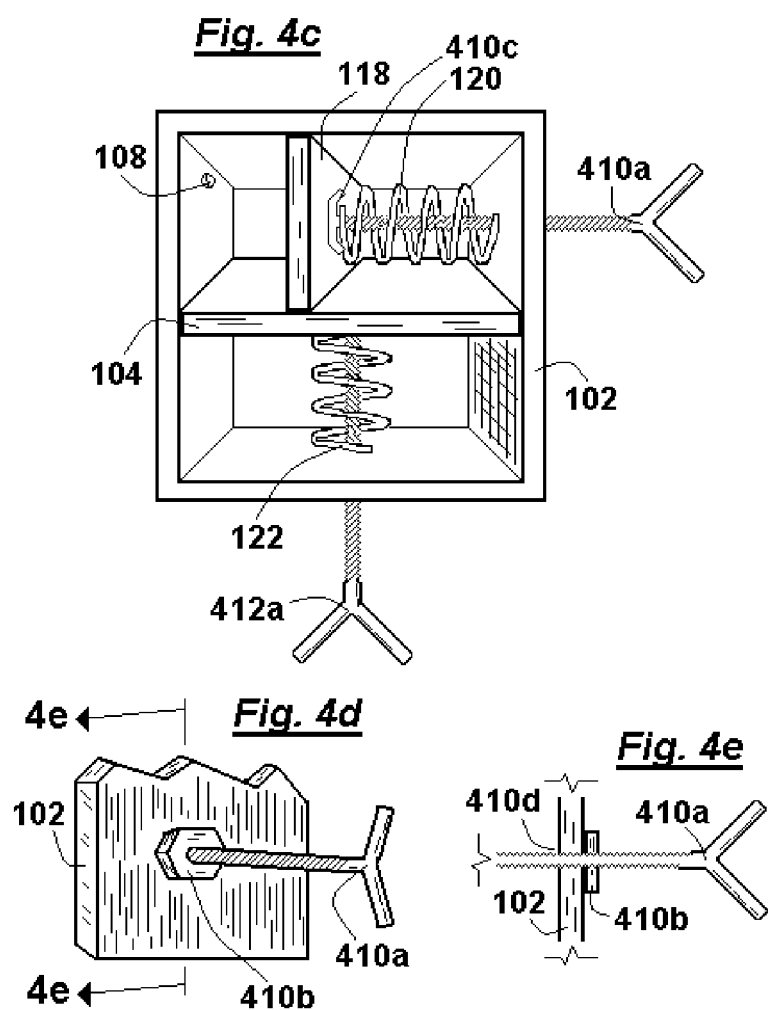

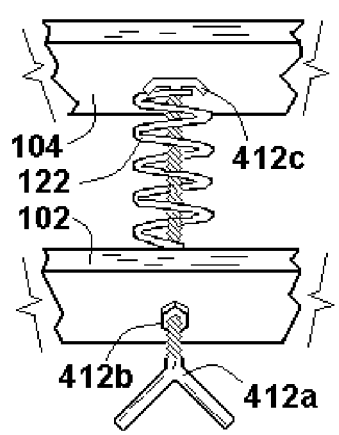 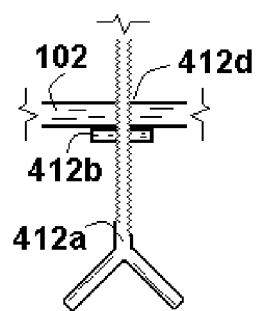

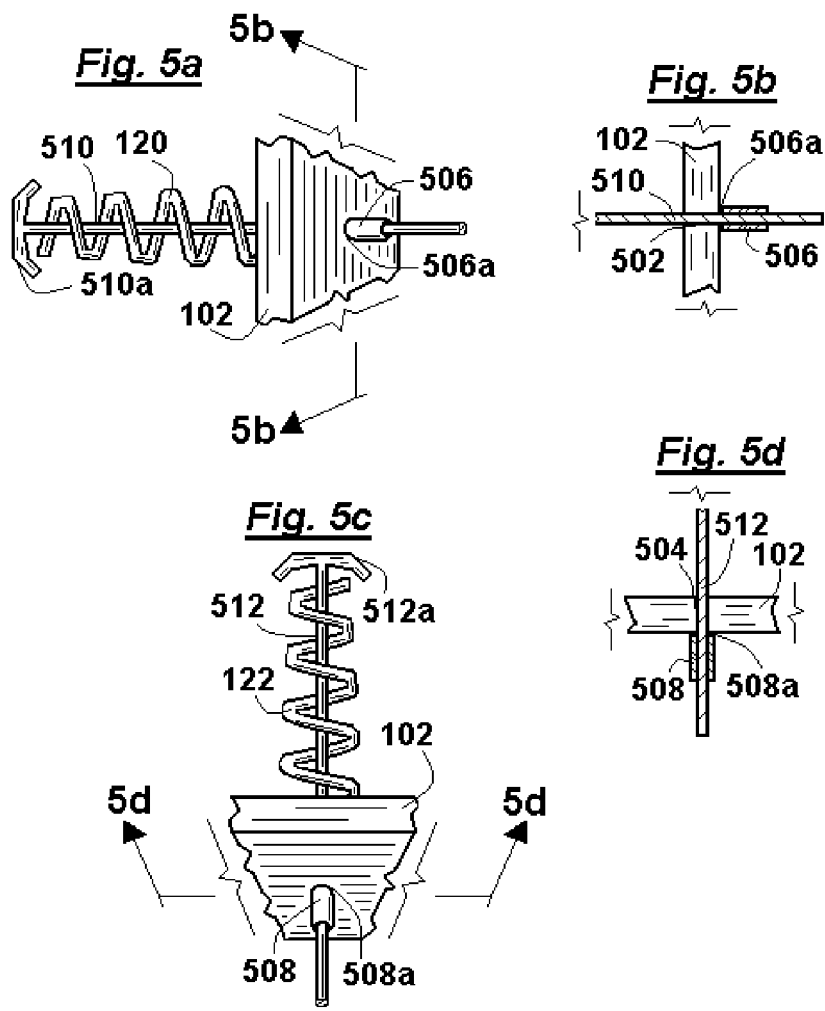

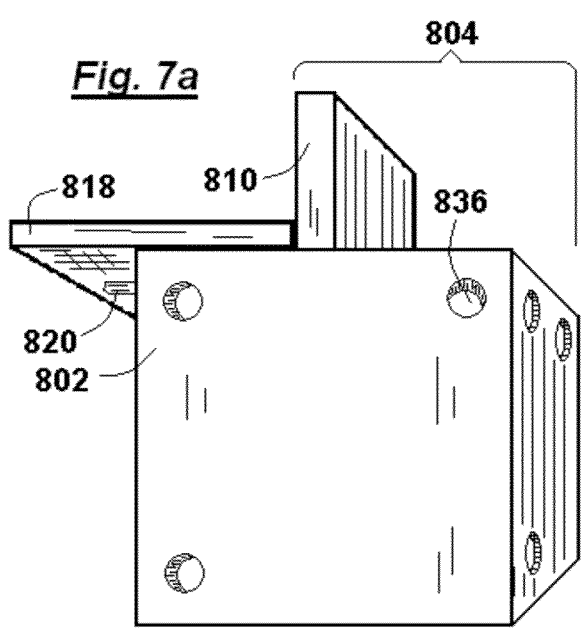

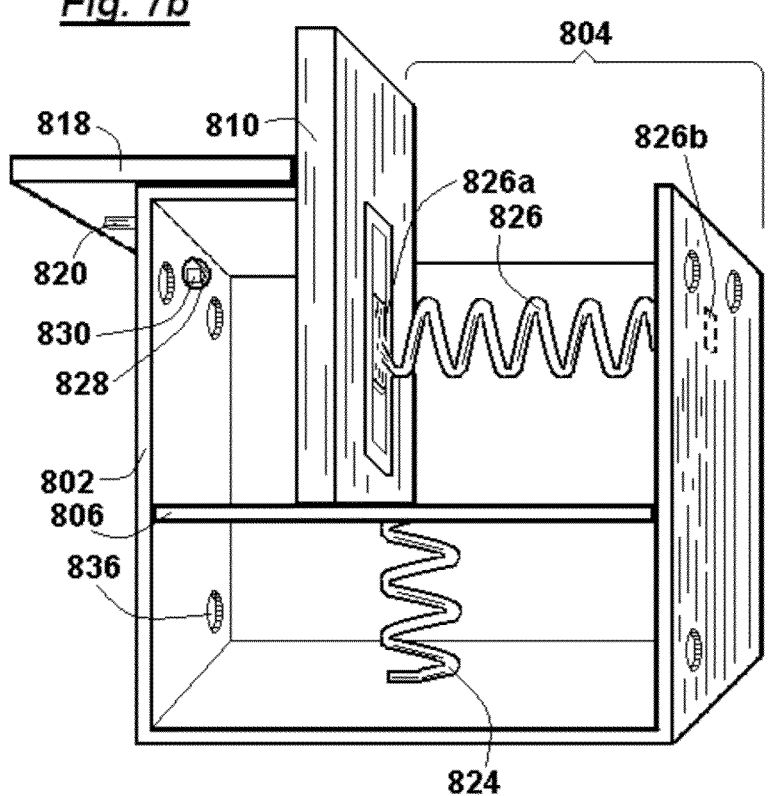

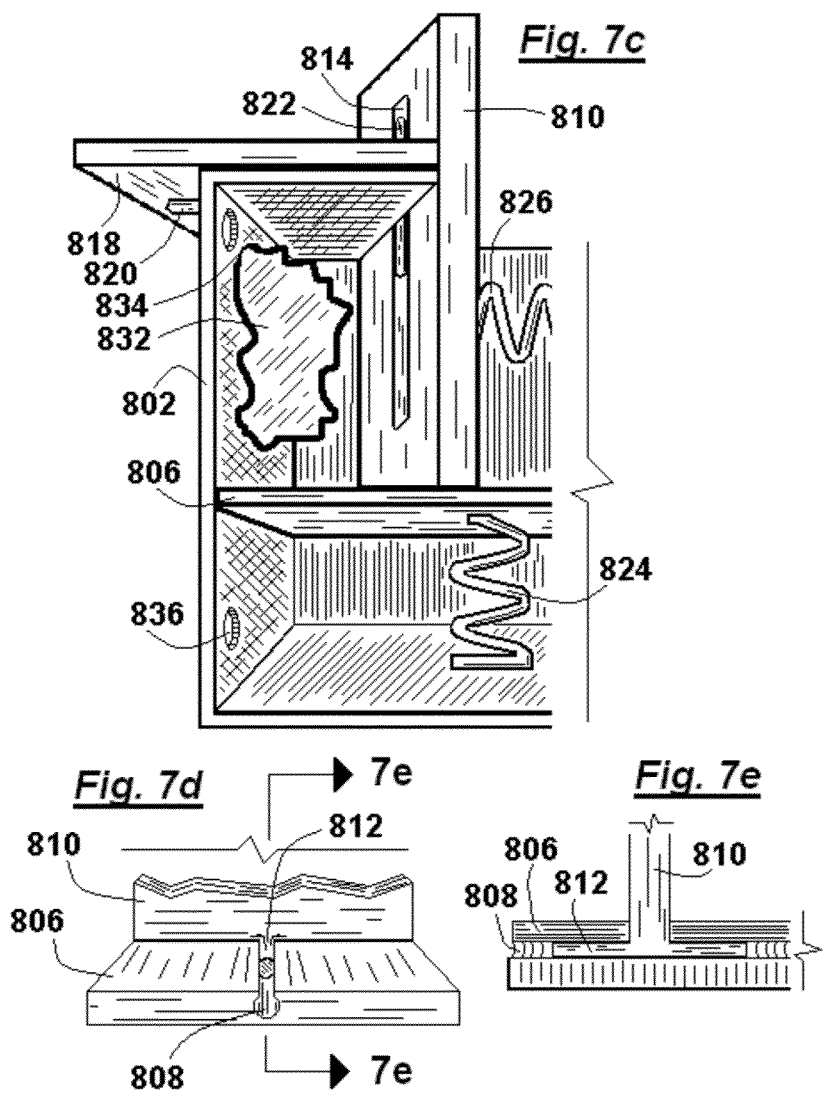

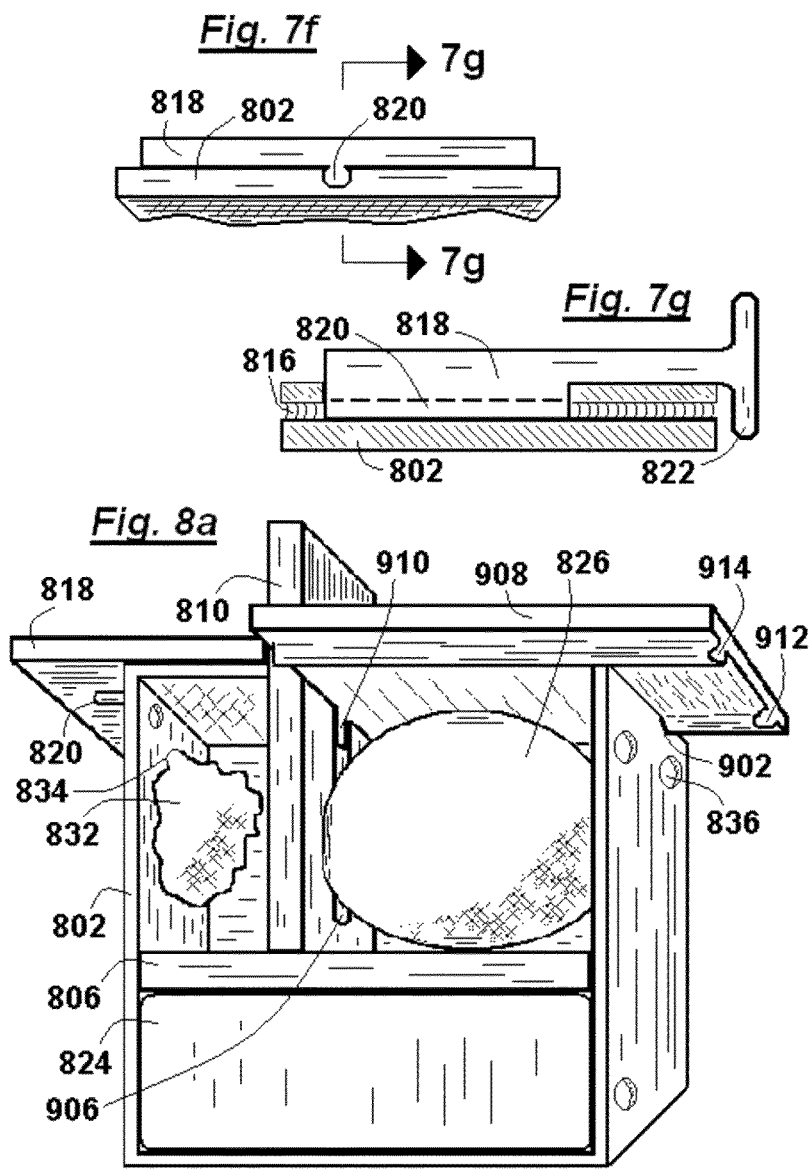

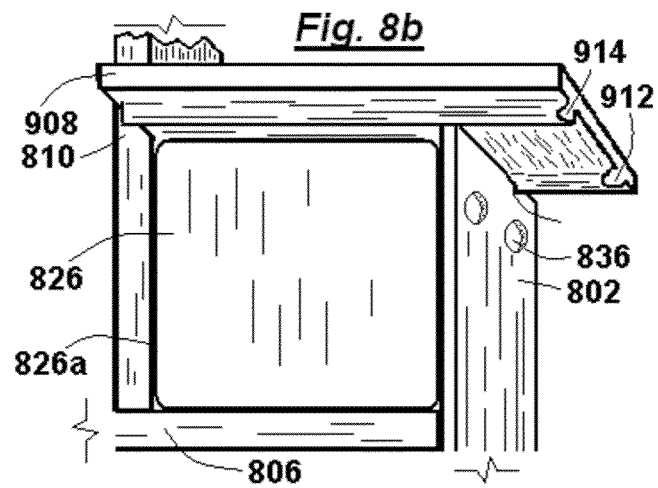
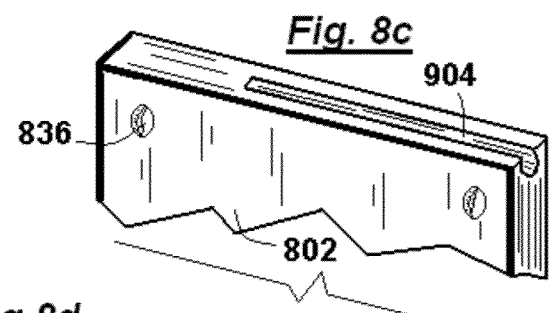
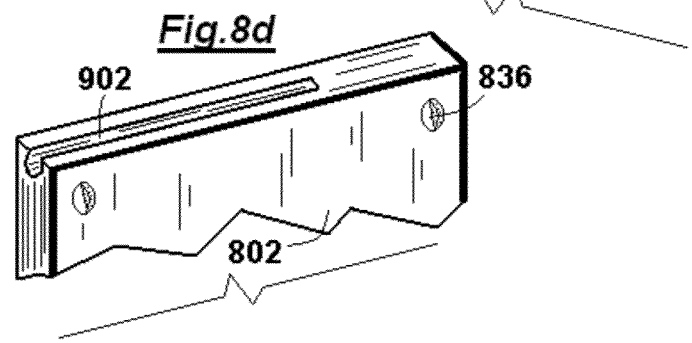

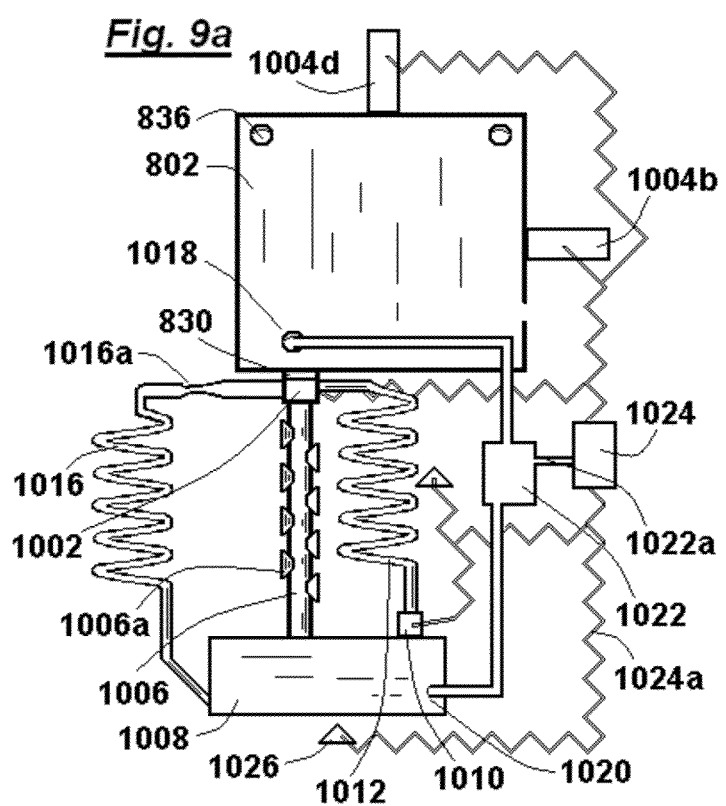

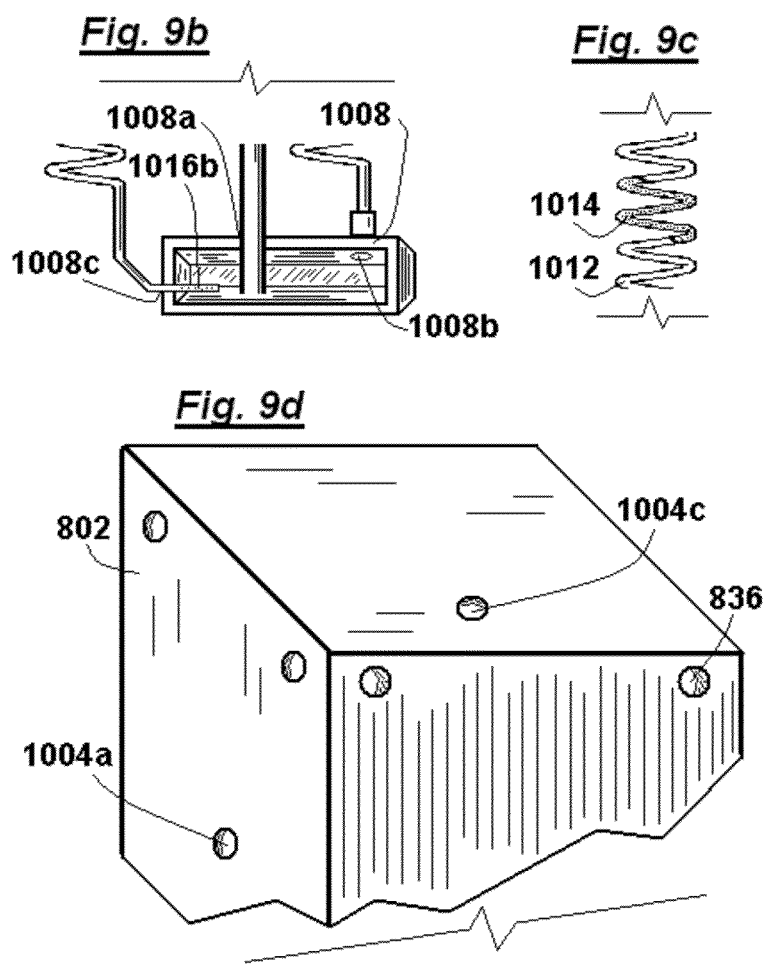

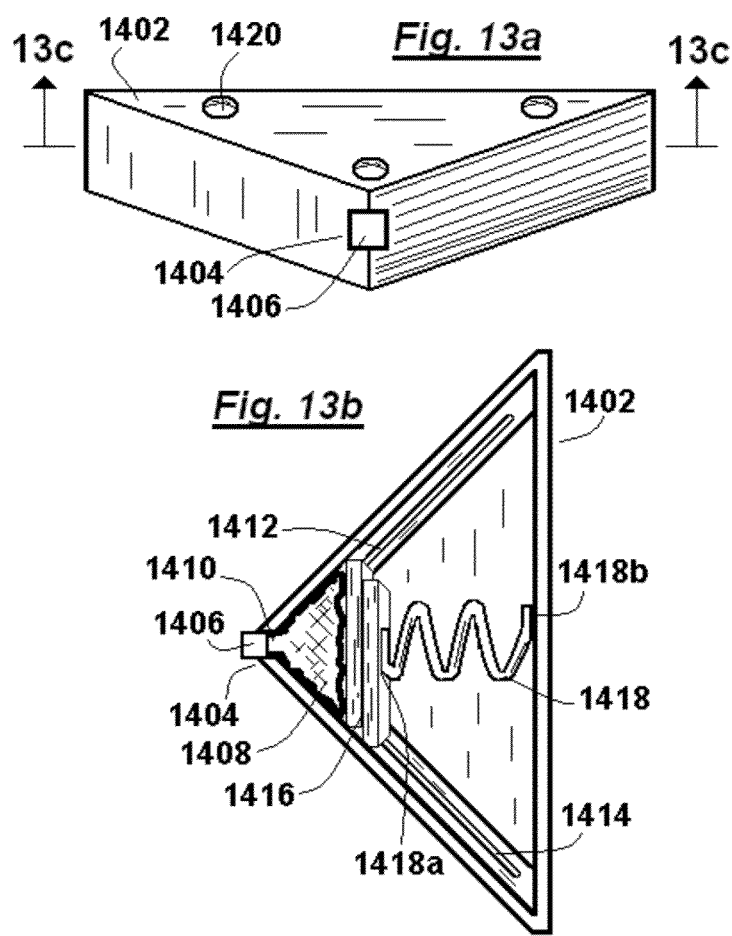

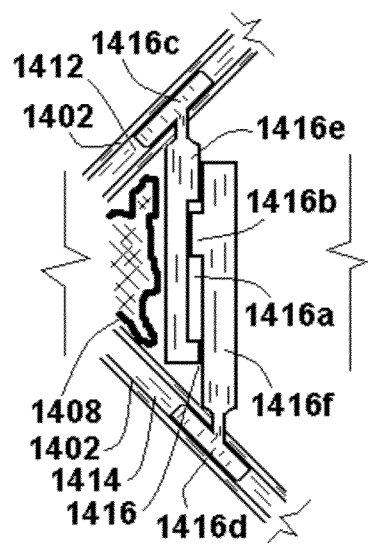
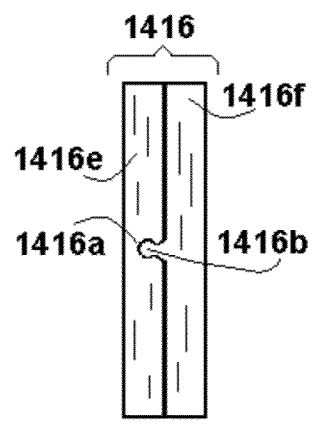
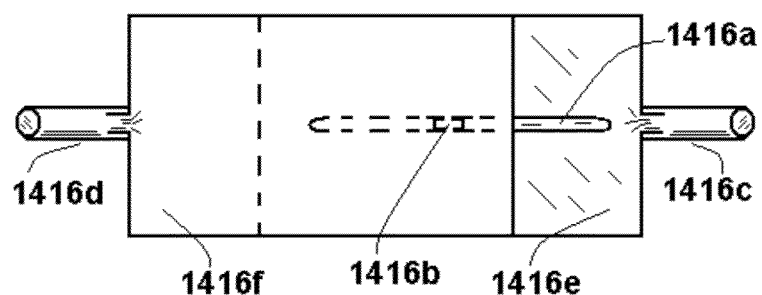

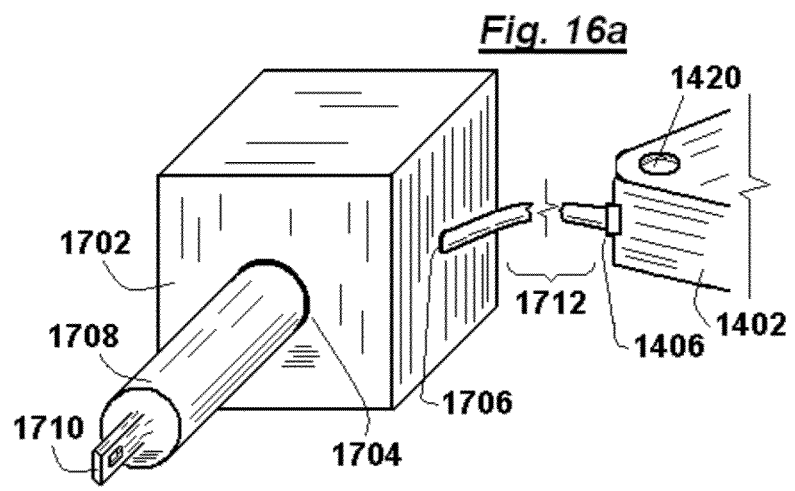
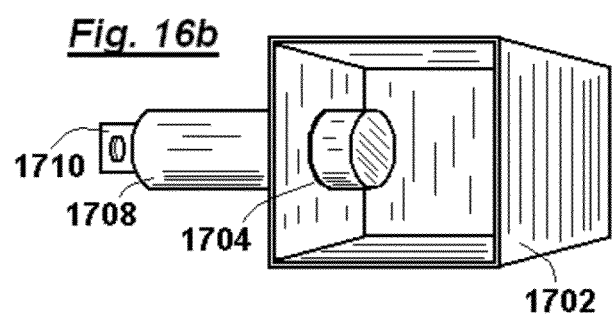

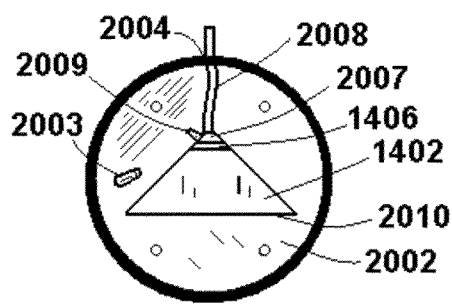
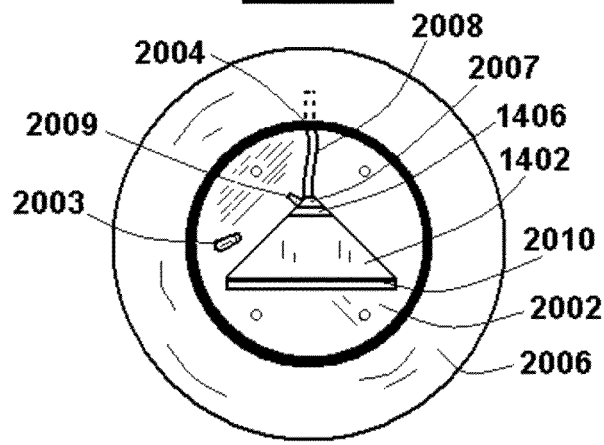

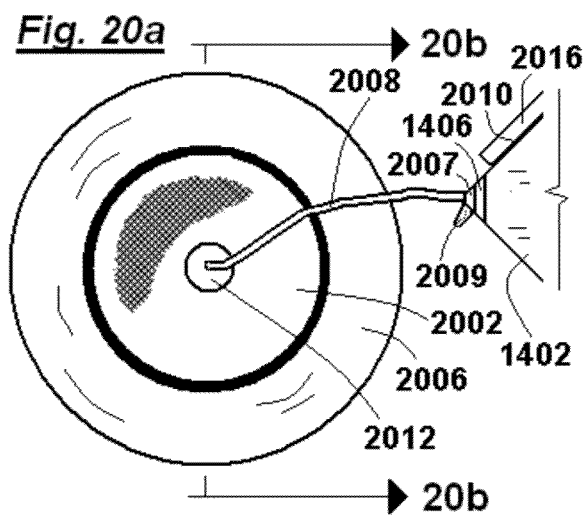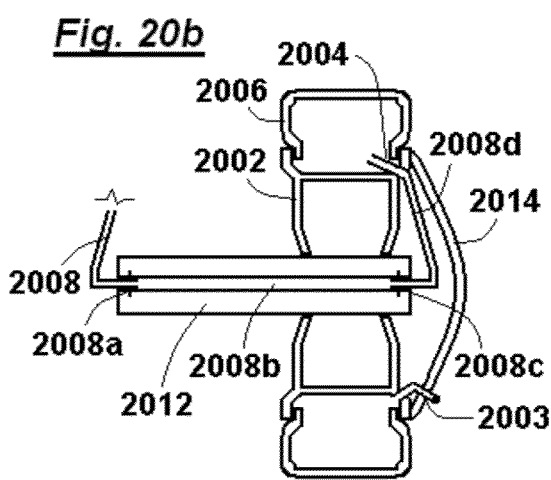

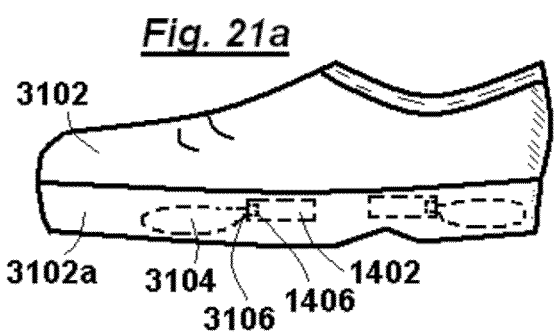
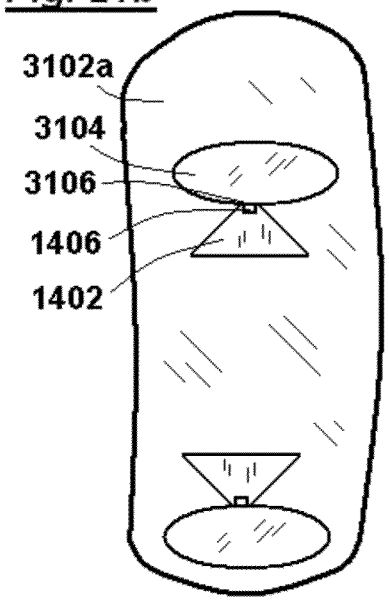

VESSEL FOR STORING FLUID AT A CONSTANT PRESSURE ACROSS A RANGE OF INTERNAL DEFORMATIONS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The present invention relates to the releasable storage of mechanical energy wherein a fluid, acting through the intermediary of one or more dimensionally variable solid plates or partitions or platforms or interfaces, transfers force to one or more resilient members in a manner that results in the pressure within the fluid remaining substantially constant across a spectrum of deformation of the resilient members, as measured when fluid flow is halted.

2. Prior Art

Devices and methods in the prior art of mechanical energy storage and dispensing, using one or more resilient members, may be divided into two general classes: those using springs, and those using gases. In either case, required input force and available output force are proportional to resilient member strain. For example, a spring requiring 50 pounds of applied force to compress it by half will require 100 pounds of force to fully compress it. Compressed gases behave similarly, except that temperature is a more relevant factor than in springs.

The above facts, embodied partly in Hooke's Law of proportionality of stress and strain, result in a problem in the prior art. Ignoring the issue of hysteresis, a relatively minor problem (on the macro level) common to both the prior art and the present invention, the main problem in the prior art is that input and output energies of a spring are each dynamic, beginning at one extreme and ending at the other. Thus, for example, if one wishes to use a spring-based mechanism to dispense a stored fluid at a constant flow rate K substantially throughout the term of expansion of the spring, in the prior art this has not been possible except to a limited degree, as when using a variable-size output aperture. But aperture control presents its own problem set. To work, the aperture must dynamically adjust as the spring expands, and must therefore have a way of being made to correspond with that expansion. Further, temperature changes may become a significant issue for a variable aperture.

Other prior art responses to these problems have included hydraulic force multipliers, reducers, and overflow and bypass valves, all of which are, for the most part, digital rather than analog remedies, generally falling short of matching input force to realtime force requirements, but the present invention addresses these issues by being truly dynamic.

The inadequacy of the above prior art response problems has serious consequences for national and global energy storage and conservation objectives. For example, considerable energy waste results from conversion of solar energy to its ultimate storage in a battery; similarly wasteful is pumped storage, used by electric utilities during low grid demand to raise a volume of water to a height for later use; both of these examples are highly inefficient energy storage and conservation methods when compared with simple present invention storage.

In the prior art are shock absorbers for aircraft, watercraft, buildings, trains, bridges, and ground vehicles, to name but a few of their uses. These most commonly assume the character of a spring, confined gas, or confined hydraulic fluid with valves to slow release of fluid, or combinations thereof, their general purpose being to damp vibration and oscillation.

However, under some circumstances, a more decisive return to state may be desirable, e.g., as when seeking to firmly and quickly return a tire to the road surface from which it has bounced. The prior art is unable to do both at the same time, i.e., at once damping and promoting response, but the present invention meets these desirable and useful goals.

The prior art has various ways of dispensing pressurized liquids and gases which have been stored in containers for such purpose. Most commonly, gases in this context are pumped into a container at elevated pressure and dispensed by opening a valve, as in the case of an oxygen tank. However, this results in gradual loss of output and valve aperture or diaphragm adjustments must be made.

In addition to these problems of fluid dispensers in the prior art, the use of spray cans in nearly all forms presents serious environmental hazards. The most commonly used propellants are known atmospheric pollutants and include volatile hydrocarbons such as propane, n-butane, isobutane, dimethyl ethers, methyl ethyl ether; cooking sprays and whipped cream use nitrous oxide and carbon dioxide as propellants; medical aids for asthma and emphysema sufferers use hydrofluoroalkanes as propellants. All contribute significantly to some combination of acid rain, global warming, oncogenesis, or general pollution, and all can be replaced by an appropriately designed embodiment of the present invention.

The prior art features fuel pumps, oil pumps, and other pumps for various purposes, and includes those which are electrical or spring driven. Electrical pumps, which to the unaided eye provide fluid flow at a constant rate, but which on closer observation are intermittent according the waveform of the underlying current, are only useful as long as there is electrical supply; when electrical supply fails, the pump fails. For reasons earlier discussed, spring-driven pumps of the prior art cannot provide flow at a constant rate. Thus, these pump types are either not consistently reliable or cannot provide flow at a constant rate, whereas the present invention is reliable and does provide flow at an analogically constant rate.

Moreover, prior art fuel and oil pumps often comprise dozens of parts, many of them moving parts, leading to complex, maintenance-intensive, and thus failure-prone apparatuses, whereas the present invention generally has only a few parts subject to movement.

In aircraft and spacecraft, fuel and lubrication delivery at constant rates is often literally a matter of life and death, and always a matter of money, considering the cost of failure. In severe turbulence, on takeoff or descent, and under certain other negative or positive acceleration circumstances, a fuel pump may temporarily fail to deliver needed amounts of fuel. Freezing temperatures may also adversely affect pump performance. Further, it is common to have at least two pumps for fuel delivery: one a low pressure pump to deliver fuel to an engine, and another within the engine itself to raise the fuel to a much higher pressure before delivery into the can, or combustion chamber. These are serious issues for aircraft and spacecraft, for all of which the present invention offers sound solutions.

Drug delivery apparatuses in the prior art for inpatient and outpatient use require great precision of dosage delivery, whether the drug is oxygen, a gas used in a surgical setting, or a drug in liquid form. Though in some instances gas stored in cylinders continues as the gaseous source, there has been wide adoption of electrical gas pumps. Liquid drug delivery of a temporary nature is done using a bag of the drug suspended above the site of introduction into a patient, but longer term liquid drug administration, particularly in outpatients, is accomplished using a battery-operated pump.

In the surgical setting, if gas cylinders are used, the aperture controls must be carefully monitored during the course of surgery to ensure appropriate dosages; or, if gas arrives from a central location outside the surgery, this still requires an infrastructure of equipment and personnel to ensure flow at a constant rate.

All of the above approaches to drug delivery have their problems: batteries are bulky, decline in power over time and thus result in undesirable dosage modification, may interfere with electrically-driven cardiac appliances, and present environmental hazards of manufacture and disposal; drip IVs reduce dosage as time passes, due to decreased fluid depth (head); direct IVs pose a risk of introducing air into a blood vessel, forming an embolism, more dangerously so if it is a central IV or one entering above the patient's shoulder level, and; regulation of gas cylinder output requires constant attention. All of these are problems which the present invention solves.

In the prior art, certain cardiac conditions are commonly addressed by use of one of a variety of blood pumps. Though truly remarkable, the technology has its shortcomings. A key problem is that these pumps have a tendency to destroy red blood cells and platelets, the clot-forming cells. The pumps may be installed internally or worn externally. Both require battery power: those installed internally have a coupling extending outside the body for recharging. The need for frequent recharging limits the time during which the patient, especially the outpatient, is free to move about. An embodiment of the present invention offers a complete solution to the problem of cell destruction, and a partial solution to the problem of battery recharging.

Service station fuel pumps are electrically operated, posing a slight but real fire hazard; they are also complex and expensive to maintain. The present invention could be used to resolve these issues.

Scientific and research uses for pumps and shock absorbers in the prior art cover a range from macroscale to nanoscale applications. Competent measurements and procedures at all scales often depend on having minimal chatter from pump equipment. Fluid turbulence is produced by all pumps in the prior art, with the exception of those which are spring-driven or driven by compressed gas, and such turbulence can create computational nightmares for researchers, and the exceptions just noted suffer from earlier discussed issues. These problems are, in the case of chatter, fully resolved by the present invention and, in the case of turbulent flow, greatly reduced.

In research, computation of energies received by shock absorbing devices depends on the sensitivity of the devices themselves and on reproducibility of shock events, the latter being virtually impossible to exactly reproduce with the prior art, whereas the present invention can not only be designed for great sensitivity but can be audited with great accuracy after a shock event as a test against original data by simply allowing it to return to its ground state while measuring fluid output and controlling for hysteresis.

As can be seen from the foregoing, shock absorbers and pumps in the prior art are used in many and varied settings, only a few of which have been so far mentioned by way of example and not limitation as to present invention application. The prior art's relationship, or lack thereof, to the present invention and its scope should therefore be judged by the appended drawings and claims and their legal and equitable equivalents.

In the prior art, tires lose pressure as they lose air; they also gain or lose pressure as temperature changes. Tires are designed for an optimal air pressure; non-optimal pressures adversely alter performance characteristics, safety, fuel mileage, and ride comfort. Use of one or more embodiments of the present invention can maintain constant pressure and prevent pressure alterations.

OBJECTS AND ADVANTAGES

Objects and advantages of the present invention include but are not limited to the following:

(a) to provide a system whereby a fluid may be stored mechanically and later dispensed at a substantially constant rate of flow;

(b) to provide a more compact and efficient means of storing mechanical energy;

(c) to provide a reliable, safe, and versatile positive pump and vacuum pump;

(d) to provide a more useful and efficient shock absorber, useful in conveyance suspension systems (land, marine, and aerospace), footwear, exercise equipment, architectural shock damping systems, and research systems;

(e) to provide a safer and more useful cardiac assist and circulation device;

(f) to reduce reliance on batteries to store energy, with an according reduction in adverse environmental consequences of battery use;

(g) to provide a pump to supply fluid flow without chatter for research and other specialized purposes, and with great reduction of turbulence;

(h) [deleted]

[i] to provide a simple refrigeration system adapted to operate on solar power or with locally available fuels, thereby providing developing regions with badly needed refrigeration for medicines and foodstuffs;

[j] to provide a device to simultaneously dispense more than one fluid with identical force for each;

[k] to provide an educational device for teaching principles of mathematics, hydraulics, chemistry, and physics;

[l] to provide a mechanical, electrically independent fuel tank and fuel pump for a reaction-drive motor;

[m] to provide a better, quieter cooling device for a computer and related parts;

[n] to provide more reliable medicament dispensing devices;

[o] to provide a high-capacity constant-output gas storage device for a gas-driven conveyance;

[p] to provide a more reliable mechanical fuel pump for an aircraft;

[q] to provide a device for storing naturally occurring energy for other uses;

[r] to provide a device for supplying starting power to a combustion-operated conveyance;

[s] to provide a device to supply useful, reliable fluid power at a constant rate in environments where it is impractical or undesirable to use conventional power sources, such as in underwater or space environments;

[t] to provide a quieter power source for submersible vehicles for environmental research, and;

[u] to provide a device to facilitate improved tire performance and safety.

SUMMARY

The present invention is a novel device for storing fluids under pressure, and for dispensing them at a substantially constant rate of flow without resort to constant aperture adjustments or other measures. It achieves this by use of one or more rigid and expandable surfaces against which a fluid may act, which surface(s) act against one or more elastically deformable members, thereby creating a situation wherein total force acting on a resilient member is continuously increasing in step with the resistance of the resilient member as it is compressed, this process operating in reverse as the resilient member decompresses.

DRAWINGS

Figures

Figure descriptions are as follows:

FIG. 1a shows an exterior view of the present invention, its nominal front in foreground.

FIGS. 1d and 1e are detailed cross-sectional views of nominal top wall of the present invention, a groove, a partition, and tongue of partition in the groove.

FIG. 1f is an isolated view of an upper portion of partition and its tongue.

FIG. 1g is an isolated view of a lower portion of partition and its tongue seated in a platform groove.

FIG. 1h is a cross-sectional view of a lower portion of partition and its tongue seated in a platform groove.

Figure 1B:
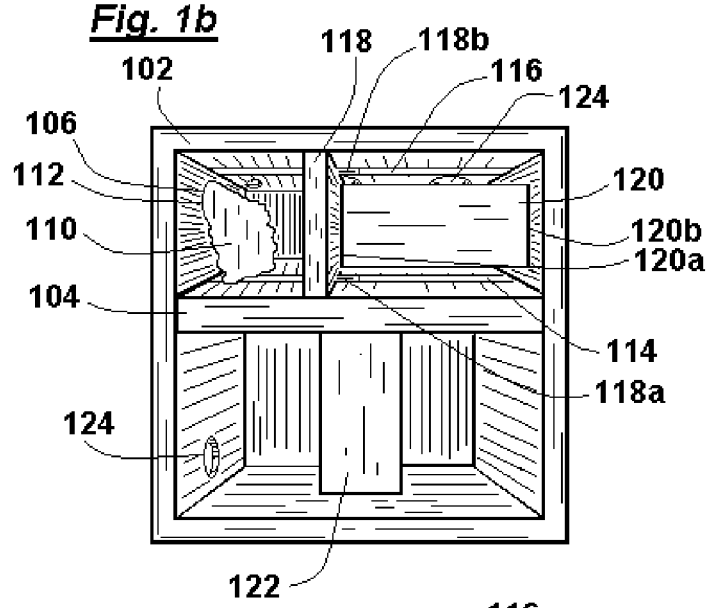
FIG. 1b is a nominal right-side view of the present invention with right wall removed, showing internal components bag, storage, partition, and platform.
Figure 1C:
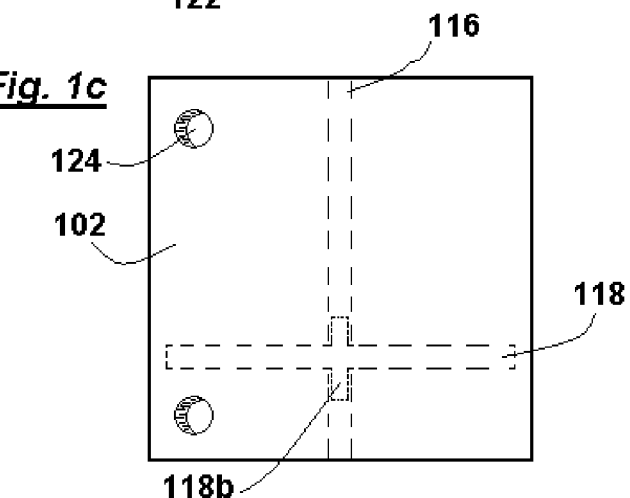
FIG. 1c is a nominal top view of the present invention.

FIGS. 1i, 1j, 1k, and 1l are various views of partition parts showing tongue and groove arrangements.

FIG. 2a is an exterior view of the present invention, its nominal front in foreground, with plate and retainer securing an upper opening.

FIG. 2b is a top view of the present invention showing retainer and part of plate.

FIGS. 2c and 2d are cross-sectional views of a spring and pin assembly as part of a speculative releasable self-locking mechanism near, respectively, the nominal right and left sides of the present invention and partition.

FIG. 2e shows a bar with prongs as the releasing tool of the releasable self-locking mechanism.

FIGS. 2f and 2g are cross-sectional views of a spring and pin assembly as part of a speculative releasable self-locking mechanism near, respectively, the nominal right and left sides of the present invention and platform.

FIG. 2h shows a bar with a prong as a releasing tool of the releasable self-locking mechanism in the platform.

FIG. 3a is an exterior view of the present invention, its nominal front in foreground, with plate and retainer securing an upper opening.

FIG. 3b is a top view of the present invention showing retainer and part of plate.

FIG. 3c is a nominal right-side view of the present invention with right wall removed, showing components storage, partition, platform, and indexing elements.

FIG. 3d is an external view of a section of the nominal rear wall of housing showing part of indexing elements.

FIG. 3e is a cross-sectional view of a section of the nominal rear wall of housing showing part of indexing elements.

FIG. 3f is a cutoff view of platform and nominal bottom wall of housing, showing storage and indexing elements.

FIG. 3g is a cross-sectional view of nominal bottom wall of housing, showing indexing elements.

FIG. 4a shows a pair of the present invention and an aircraft.

FIG. 4b is a zoom detail of a pair of the present invention integral with an aircraft, showing their ducts and valves in relation to aircraft fuel supplies.

FIG. 4c is a nominal right-side view of the present invention with right wall removed, showing components storage, partition, platform, and indexing elements.

FIG. 4d is an external view of a section of the nominal rear wall of housing showing part of indexing elements.

FIG. 4e is a cross-sectional view of a section of the nominal rear wall of housing showing part of indexing elements.

FIG. 4f is an external view of a part of the platform and nominal bottom wall of housing showing part of indexing elements.

FIG. 4g is a cross-sectional view of a section of the nominal bottom wall of housing showing part of indexing elements.

FIG. 5a is an external cutoff view of nominal rear wall of housing with stabilizing rod, bushing, and storage element.

FIG. 5b is a cross-sectional view of nominal rear wall of housing with bushing and part of stabilizing rod.

FIG. 5c is an external cutoff view of nominal bottom wall of housing with stabilizing rod, bushing, and storage element.

FIG. 5d is a cross-sectional view of nominal bottom wall of housing with bushing and part of stabilizing rod.

Figure 6A:
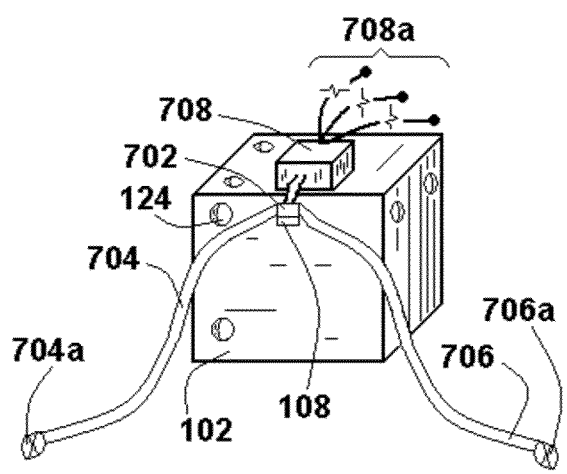

FIG. 6a is a view of the present invention with nominal front in foreground and a pair of catheters coupled to its valve.

FIG. 7a is a view of the present invention with nominal right wall in foreground and a pair of partitions in upper left area.

FIG. 7b is an enlarged (to show detail) nominal right-side view of the present invention with right wall removed, showing components storage, partitions, platform, and valve.

FIG. 7c is a nominal right-side view of the nominal front section of the present invention with right wall removed, showing components storage, partitions, platform, bag, and tongue and groove coupling between vertical partition and horizontal partition.

FIG. 7d is a cutoff view of tongue and groove interface of partition and platform.

FIG. 7e is a cross-sectional view of tongue and groove interface of partition and platform.

FIG. 7f is a cutoff view of tongue and groove interface of top horizontal partition and nominal top wall of housing.

FIG. 7g is a cross-sectional view of tongue and groove interface of top horizontal partition and nominal top wall of housing.

FIG. 8a is a nominal right-side view of the present invention with right wall removed, showing components storage as gas bags, the upper gas bag only partially inflated, partitions, platform, bag, and tongue and groove coupling between vertical partition and rearmost horizontal partition, and part of the nominal left tongue and groove coupling between rearmost partition and left housing wall.

FIG. 8b is a nominal right-side cutoff view of the present invention with right wall removed, showing upper storage as fully inflated gas bag, partitions, and platform.

FIGS. 8c and 8d show, respectively, grooves in tops of right and left walls of housing.

FIG. 9a is an external nominal front and partly schematic view of the present invention with tank, sensor, controller, releasable self-locking devices, ducts, and heat sources, the heat sources not being part of the invention.

FIG. 9b is a nominal front cutoff view of tank with front wall removed, showing ducts coupled to tank and multiple holes in the end portion of one duct.

FIG. 9c shows cutaway cutoff view of duct with dessicant in it.

FIG. 9d is an external cutoff view of housing with rear wall in foreground, disclosing access holes in top and nominal right side of housing.

Figure 10A:
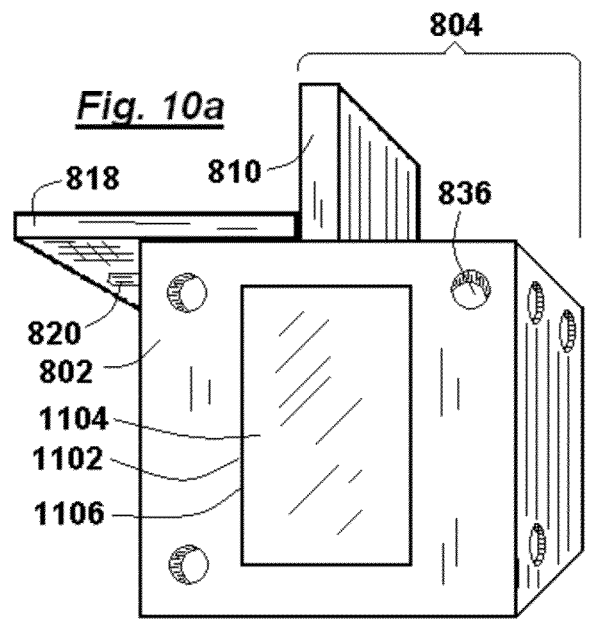

FIG. 10a is a view of the present invention from nominal right side, with transparent plate embedded in nominal right wall.

Figure 11A:
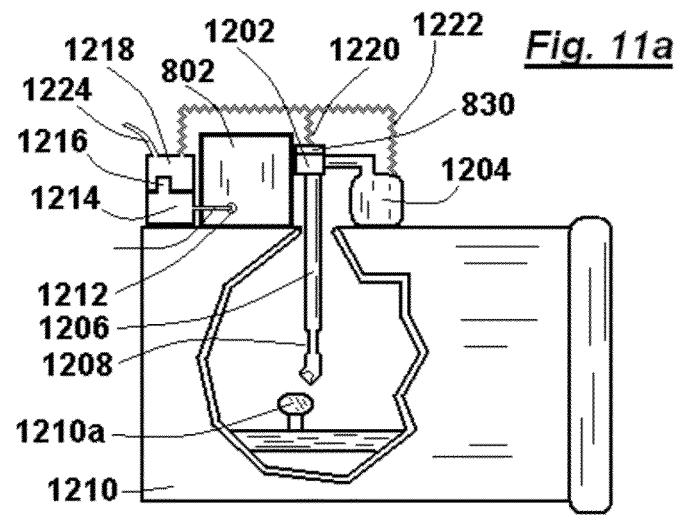

FIG. 11a is a cutaway view of a computing apparatus and atop it an air compressor, ducts, the present invention, sensor, controller, and schematic adaptations for controlling the air compressor and valve of the present invention.

Figure 12A:
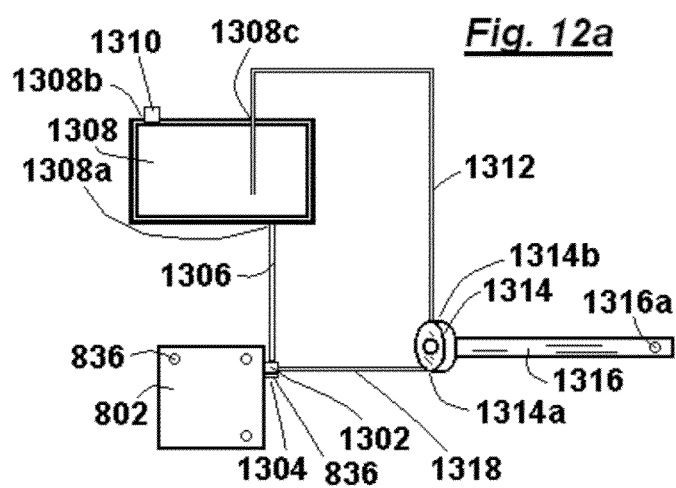

FIG. 12a is a partly schematic view of the present invention coupled by ducts to a fluid-driven actuator and to a reservoir, with the reservoir and actuator coupled by a duct.

Figure 12B:
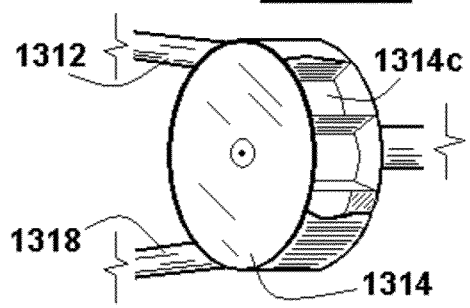

FIG. 12b is a cutaway view representation of a fluid-driven actuator.

FIG. 13a is a nominal front view of the present invention with valve and pressure relief openings.

FIG. 13b is a nominal top view of the present invention with top wall of housing removed, disclosing valve, bag, partition, storage and grooves.

FIG. 13c is a nominal top cross-sectional view of the present invention disclosing part of bag, grooves in housing walls, tongues of partition, and a speculative representation of tongue and groove relationships between a pair of partition plates.

FIG. 13d discloses a speculative representation of tongue and groove relationships between a pair of partition plates, showing hidden tongue and groove.

FIG. 13e is a speculative cross-sectional view of a tongue and groove relationship between two plates of a partition.

Figure 14A:
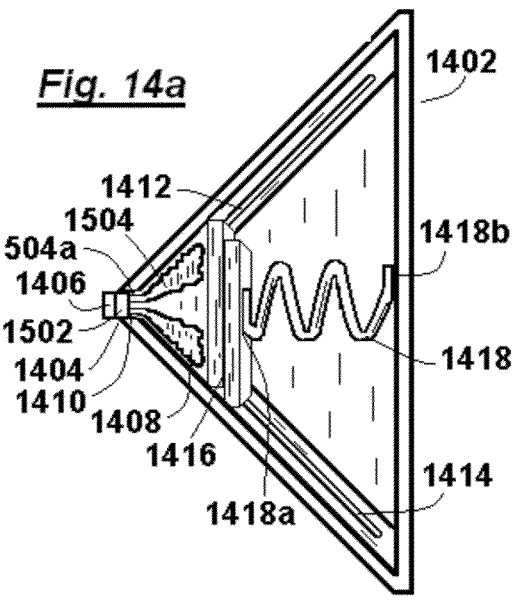

FIG. 14a is a nominal top view with top wall of housing removed, disclosing valve, partition, storage, grooves, and a valve adaptation coupled to a pair of bags.

Figure 15A:
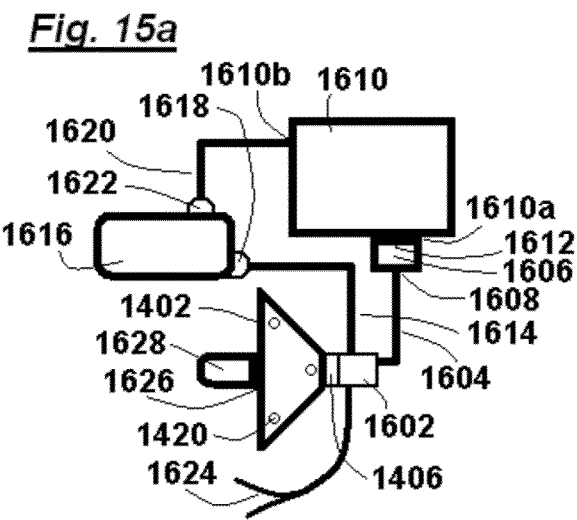

FIG. 15a is a schematic representation of the present invention, an indexing device, a duct coupling the present invention to a fluid-driven electrical generator, a duct from the generator to a reservoir, a duct from the reservoir to the present invention, and electrical control conduit coupled to the valve adaptation.

FIG. 16a discloses part of the present invention coupled by a duct to a reservoir with a piston disposed through a wall of the reservoir, and an adaptation on the piston end.

FIG. 16b discloses a reservoir with nominal right wall removed, showing the piston positioned through the nominal front wall and into the interior of the reservoir.

Figure 17A:
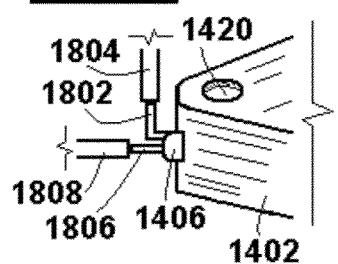

FIG. 17a is a cutoff view from nominal right of the present invention with a valve adaptation coupled to the output line of an air pump and to the air supply port of an air-driven actuator.

Figure 18A:
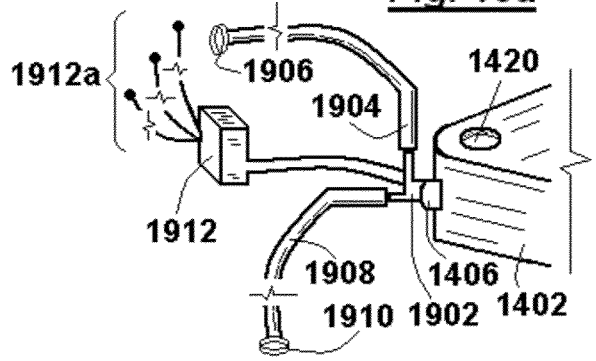

FIG. 18a is a cutoff view from nominal right of the present invention, with a valve adaptation coupled to a pair of catheters, a controller coupled to the valve adaptation, and sensors.

FIG. 19a is an orthogonal view of the outer surface of a tire rim with an embodiment of the present invention attached.

FIG. 19b is an orthogonal view of the outer surface of a tire rim with an embodiment of the present invention attached, and a tire mounted on the rim.

FIG. 20a is an orthogonal view of an alternative embodiment of the present invention, showing inner surface of a tire rim with a tire mounted on it, the present invention attached to a part of conveyance frame, and a duct coupling the present invention to the inside end of an axle.

FIG. 20b is a cross-sectional view of FIG. 20a.

FIG. 21a is a medial view of an alternative embodiment of the present invention, showing a shoe and (hidden) the present invention with (hidden) air sacs attached.

FIG. 21b is a bottom cutaway view of the sole of the shoe of FIG. 21a, showing embodiments of the present invention with air sacs attached.

DRAWINGS

Reference Numerals and Terms

Drawing reference numerals and terms are as follows:
102 housing; 104 platform; 106 first opening in housing; 108 first valve; 110 bag; 112 bag opening; 114 first groove; 116 second groove; 118a first tongue; 118b second tongue; 120 first storage; 120a slidable interface(s); 120b attachment of first storage; 122 second storage; 124 plurality of housing openings; 200a closable opening of housing; 202 adaptation of first valve; 204 rigid plate; 206 retainer; 208(a-m) releasable self-locking mechanism; 210(a-m) releasable self-locking mechanism; 302 valve adaptation; 304 access hole; 306 plate; 308 retainer; 310 first indexing device; 312 second indexing device; 402 valve adaptation; 404a one of a plurality of ducts, this one from a fuel tank; 404b one of a plurality of ducts, this one to an engine fuel intake line; 406a aircraft; 406b engine fuel intake line; 406c aircraft engine; 406d aircraft fuel tank; 408 one of a plurality of valves; 410(a-d) first indexing mechanism; 412(a-d) second indexing mechanism; 502 first access hole; 504 second access hole; 506 first bushing; 506a attachment of first bushing to rear wall of housing; 508 second bushing; 508a attachment of second bushing to bottom wall of housing; 510 first rod; 510a coupling adaptation of first rod; 512 second rod; 512a coupling adaptation of second rod; 702 adaptation of first valve; 704 first catheter; 704a coupling adaptation of first catheter; 706 second catheter; 706a coupling adaptation of second catheter; 802 housing; 804 first opening in housing; 806 platform; 808 first groove in platform; 810 first partition; 812 tongue of lower end of partition; 814 second groove; 816 third groove; 818 second partition; 820 first tongue of second partition; 822 second tongue of second partition; 824 first storage device; 826 second storage device; 826a slidable interface of second storage device; 826b attachment of second storage device to interior wall of housing; 828 second opening in housing; 830 first valve; 832 bag; 834 bag opening; 902 fourth groove; 904 fifth groove; 906 sixth groove; 908 third partition; 910 first tongue of third partition; 912 second tongue of third partition; 914 third tongue of third partition; 1004a first access hole in housing; 1004b first self-locking device; 1004c second access hole in housing; 1004d second self-locking device; 1006 first duct; 1008 tank; 1008a first tank opening; 1008b second tank opening; 1008c third tank opening; 1010 second valve; 1012 second duct; 1014 dessicant; 1016 third duct; 1016a expansion valve of third duct; 1016b plurality of holes in third duct; 1018 fourth opening in housing; 1020 fourth opening in tank; 1022 sensor; 1022a sensor data conduit; 1024 controller; 1024a controller adaptations for controlling various operations; 1026 heat sources; 1102 third opening in housing; 1104 transparent plate; 1106 attachment of transparent plate to housing; 1202 adaptation of first valve; 1204 air compressor; 1206 duct; 1208 expansion valve of duct; 1210 computing apparatus; 1210a a part of computing apparatus requiring cooling; 1212 access hole in housing; 1214 sensor; 1216 first data conduit; 1218 controller; 1220 controller control adaptation to adaptation of first valve; 1222 controller control adaptation to compressor; 1224 second data conduit; 1302 adaptation of first valve; 1304 first relief valve; 1306 first duct; 1308 reservoir; 1308a first opening of reservoir; 1308b second opening of reservoir; 1308c third opening of reservoir; 1310 second relief valve; 1312 second duct; 1314 fluid-driven actuator; 1314a intake port of actuator; 1314b output port of actuator; 1316 shaft of actuator; 1316a adaptation of shaft of actuator; 1318 third duct; 1402 housing; 1404 first opening into housing; 1406 first valve; 1408 bag; 1410 bag opening; 1412 first groove; 1414 second groove; 1416 partition; 1416a groove in frontmost partition plate; 1416b tongue in rearmost partition plate; 1416c tongue of frontmost partition plate; 1416d tongue of rearmost partition plate; 1416e frontmost partition plate; 1416f rearmost partition plate; 1418 storage; 1418a slidable interface of storage; 1418b attachment of storage to housing; 1420 one of plurality of housing openings; 1502 first valve adaptation; 1504 second bag; 1504a opening of second bag; 1602 adaptation of first valve; 1604 first duct; 1606 impeller; 1608 impeller output port; 1610 reservoir; 1610a first opening of reservoir; 1610b second opening of reservoir; 1612 impeller intake port; 1614 second duct; 1616 fluidic electrical generator; 1618 intake port of fluidic electrical generator; 1620 third duct; 1622 output port of fluidic electrical generator; 1624 electrical conduit; 1626 further opening into housing; 1628 indexing device; 1702 reservoir; 1704 first opening into reservoir; 1706 second opening into reservoir; 1708 piston; 1710 adaptation of nether end of piston; 1712 duct; 1802 first adaptation of first valve; 1804 air pump output line; 1806 second adaptation of first valve; 1808 air supply port of air driven actuator; 1902 adaptation of first valve; 1904 first catheter; 1906 distal opening of first catheter; 1908 second catheter; 1910 distal opening of second catheter; 1912 controller; 1912a sensors; 2002 wheel rim; 2004 opening in wheel rim; 2006 tire; 2007 adaptation of valve 1406; 2008 duct; 2009 second valve; 2010 fastener; and for the Alternative Embodiment of FIGS. 30a and 30b, the following additional numbers and terms not listed above: 2008a first rotatable seal, 2008b tunnel in axle, 2008c second rotatable seal, 2008d duct extension, 2012 axle, 2014 wheelcover (hubcap), 2016 part of conveyance; and for the Alternative Embodiment of FIGS. 31a and 31b, the following additional numbers and terms not listed above: 3102 shoe, 3102a sole of shoe, 3104 air sac, 3106 opening in air sac.

DETAILED DESCRIPTION

Preferred Embodiments—FIGS. 1a-20b, Inclusive

An embodiment of the present invention is illustrated in FIGS. 1a-1l, inclusive. The drawings disclose rigid housing 102. Platform 104 is of such thickness along its nominal vertical axis as may deter departure of it from its illustrated rectilinear relationship with housing 102. In platform 104 is groove 114, specialized to slidably and retainably receive tongue 118a formed by partition 118. Partition 118, which is substantially rigid in the plane normal to its nominal vertical axis, is envisaged in FIGS. 1j and 1k as a group of slidably interlocking plates, in FIG. 1j the bottom of the nominal leftmost plate thereof forming tongue 118a, and the nominal rightmost plate thereof forming at its top tongue 118b; FIG. 1j also illustrates tongue 118c of one such plate interlocking groove 118d of another such plate. As shown in FIG. 1d, the nominal interior top of housing 102 forms groove 116, which is specialized to slidably and retainably receive tongue 118b. This arrangement enables alteration of the nominal vertical height (and surface area) of partition 118 upon vertical movement of platform 104, and it enables alteration of the surface area of platform 104 on the nominal left side of partition 118 upon nominal lateral movement of partition 118. Nominally above platform 104 and to the left of partition 118 is bag 110, as shown in FIG. 1b. Bag 110 forms opening 112, which is sealably coupled to valve 108, which is disposed in housing 102 opening 106. Bag 110 and valve 108 enable introduction of a fluid into bag 110 so as to apply force to partition 118 and to platform 104, which in turn, respectively, apply force to storage device 120 and storage device 122. A plurality 124 of openings in housing 102 prevent gas capture and unwanted pressure accumulation within housing 102. In FIG. 1b are also attachment 120b and slidable interface 120a, both of storage device 120, which help to assure a fixed orientation of storage device 120 with respect to partition 118. The overall effect of these arrangements is to enable dynamic changes in stress being applied to storage device 120 and storage device 122 to substantially keep pace with their dynamic stress changes according to the extent of their deformation, at the same time enabling fluid pressure in bag 110 to remain substantially constant (when fluid is not flowing past valve 108) across a spectrum of deformation of storage device 120 and storage device 122.

Operation—FIG. 1a-1b, Inclusive

The device of FIG. 1a-1b is operated by opening valve 108 and introducing a fluid therethrough into bag 110 until storage 120 and 122 are at least partially compressed, then closing valve 108; open valve 108 when ready to dispense the stored fluid.

An embodiment of the present invention is illustrated in FIGS. 2a-2h, inclusive. Key features of this embodiment, in addition to those of FIG. 1A-1B, are its enabling of easy bag 110 and valve 108 replacement, access to compress storage device 120 and storage device 122 by applying force to partition 118 and to platform 104, and releasable self-locking capability. A removable plate 204 covers housing 102 opening 200a, is kept in place by retainer 206 and may be removed by sliding the bar of retainer 206, shown in FIG. 2a, from under a pair of clips (also part of retainer 206). Enablement of the self-locking capability for partition 118 is achieved by a pair of holes 208a and 208h in the nominal top of housing 102 in combination with a pair of pin (208b and 208i) and spring (208d and 208k) assemblies embedded in shafts (208f and 208m) in the nominal top of partition 118. As partition 118 moves nominally rearward, pins 208b and 208i engage holes 208a and 208h to lock the position of partition 118 at a location less than or equal to maximum compression of storage device 120. The just described locking mechanism is released with tool 208g by inserting its prongs into holes 208a and 208h and applying force to disengage pins 208b and 208i. Enablement of the self-locking capability for platform 104 is achieved by a pair of holes 210a and 210h in the nominal right and left sides of housing 102 in combination with a pair of pin (210b and 210i) and spring (210d and 210k) assemblies embedded in shafts (210*f* and 210*m*) in the nominal right and left sides of platform 104. As platform 104 moves nominally downward, pins 210*b* and 210*i* engage holes 210*a* and 210*h* to lock the position of partition 118 at a location less than or equal to maximum compression of storage device 122. The just described locking mechanism is released with tool 210*g* by inserting its prong into holes 208*a* and 208*h* and applying force to disengage pins 208*b* and 208*i* (two such tools used simultaneously are envisioned). Springs 208*d* and 208*k* are attached to partition 118 at 208*e* and 208*l*, respectively, and to pins 208*b* and 208*i* at 208*c* and 208*j*, respectively, to ensure that pins 208*b* and 208*i* perform their locking functions and do not escape the apparatus. Springs 210*d* and 210*k* are attached to platform 104 at 210*e* and 210*l*, respectively, and to pins 210*b* and 210*i* at 210*c* and 210*j*, respectively, to ensure that pins 210*b* and 210*i* perform their locking functions and do not escape the apparatus.

Operation—FIGS. 2*a*-2*h*, Inclusive

In addition to the operation teachings for FIGS. 1A-1B, replacement of bag 108 and valve 110 and compression of storage 120 and 122 are accomplished by releasing retainer 206 to free plate 204, then removing existing bag 108 and valve 110, then manually moving platform 104 and partition 118 until their self-locking mechanisms 208(*a-f, h-m*) and 210(*a-f, h-m*) engage to lock storage 120 and 122 in place, then installing a fresh bag-valve assembly, with bag 108 containing a fresh supply of blood or other medicament; then, with valve 110 closed, replace plate 204 and retainer 206, couple the delivery line to valve 110, then use tools 208*g* and 210*g* to release storage 120 and 122 by inserting the prongs thereof into openings 208*a*, 208*h*, 210*a*, and 210*h*; then open valve 110 to resume medicament or blood delivery.

An embodiment of the present invention is illustrated in FIGS. 3*a*-3*m*, inclusive. The key features of this embodiment, in addition to those of FIGS. 1A-1B, and in addition to the features of easy accessibility for changing bag 110 and valve 108, and self-locking capability for storage devices 120 and 122, both already described and identical with the description of FIGS. 2A-2H above, are a pair of indexing mechanisms (310*a-d*, inclusive, and 312*a-d*, inclusive) for releasably compressing storage devices 120 and 122 and an adaptation 300*b* of valve 108 to permit it to be coupled to a blood-circulating device. The accessibility feature mentioned also permits sliding of partition 118 and platform 104 to positions as near as practicable to, respectively, storage devices 120 and 122 while they are in a compressed state.

Operation—FIGS. 3*a*-3*g*, Inclusive

In addition to the operation teachings for FIGS. 1A-1B, and operation teachings for FIGS. 2A-2H relating to replacement of bag 108 and valve 110 (identical except for part numbers), in the embodiment of FIGS. 3*a*-3*g* compression of storage 120 and 122 is accomplished by tightening hex nuts 310*b* and 312*b* firmly against housing 102, then rotating threaded shafts 310*a* and 312*a* in a direction to cause compression of storage devices 120 and 122; once valve 110 is (optionally) replaced and bag 108 is replaced (and refilled with blood), and plate 306 and retainer 308 re-installed, then (with valve 110 closed) hex nuts 310*b* and 312*b* may be loosened and moved towards the handles of their respective threaded shafts 310*a* and 312*a* a distance which will permit complete expansion of storage 120 and 122.

An embodiment of the present invention is illustrated in FIGS. 4*a*-4*e*, inclusive. FIG. 4*a* shows two devices of the present invention installed in an aircraft, and an enlarged view of this in FIG. 4*b*. Among the distinguishing features of this embodiment, in addition to those of FIGS. 1A-1L, and in addition to a pair of indexing mechanisms (identical with those of FIGS. 3C-3G) are plural use of the FIG. 1A-1L device, the nature of their interconnection through a plurality of ducts and valves, and the adaptation 402 of valve 108 to prevent and permit fluid communication between various combinations of objects, including aircraft 406*a* engine 406*c* fuel intake port 406*b*, aircraft 406*a* fuel tank 406*d* through duct 404*a*, and a plurality 408 of valves interposed in engine fuel supply duct 404*b*, these arrangements enabling any device of FIG. 1A-1L to furnish fuel, at pressure and without aid of any conventional fuel pump, to either engine 406*c* shown, and enabling fuel resupply of any device of FIG. 1A-1L from either fuel tank 406*d*. Indexing devices 410(*a-d*) and 412(*a-d*), shown in FIGS. 4*c*-4*g*, inclusive, enable storage (120 and 122) device compression for each FIG. 1A-1L device, the above interconnections enabling use of one FIG. 1A-1L device to supply fuel to both engines 406*c* while the other FIG. 1A-1L device is being indexed and resupplied with fuel. The FIG. 1A-1L devices are nominally below the level of fuel tanks 406*d*, thereby enabling resupplying them with fuel using gravity.

Operation—FIGS. 4*a*-4*g*, Inclusive

In addition to the operation teachings for FIG. 1A-1L, and operation teachings for FIGS. 3A-3G relating to compression of storage 120 and 122 (identical except for part numbers), the embodiment of FIGS. 4A-4G may be operated by: installing one or more (preferably a plurality) of the device of FIG. 1A-1L in an aerospace craft, preferably in a position nominally below the level of the craft's fuel tanks; coupling duct 404*a* at one end to at least one fuel tank and at its other end to adaptation 402 of valve 110; coupling duct 404*b* at one end to the fuel intake port of at least one engine and at its other end to adaptation 402 of valve 110; using indexing devices 410(*a-d*) and 412(*a-d*) to compress storage 120 and 122; opening all valves between the FIG. 1A-1L device(s) and fuel tank(s), configuring adaptation 402 to permit fuel flow only into bag 110 until bag 110 is full; configuring adaptation 402 to permit fuel flow only from bag 110 to the fuel intake port of at least one engine; and using indexing devices 410(*a-d*) and 412(*a-d*) to release storage 120 and 122. The configuring of adaptation 402 and operation of indexing devices 410(*a-d*) and 412(*a-d*) can be enhanced by use of remotely controlled motors or other remotely controlled mechanisms to assist in these tasks.

An embodiment of the present invention is illustrated in FIGS. 5*a*-5*d*, inclusive. Among the distinguishing features of this embodiment, in addition to those of FIG. 1A-1L, are a pair of mechanisms for stabilizing storage devices 120 and 122 when these elements are mechanical springs, embodied in the drawings as substantially rigid rods 510 and 512 respectively coupled to storage devices 120 and 122, each respectively passing through housing 102 and through bushings 506 and 508, with the bushings forming attachments with housing 102, respectively, at 506*a* and 506*b*. These arrangements help to prevent transverse spring flexion and promote efficient spring compression.

Operation—FIGS. 5*a*-5*d*, Inclusive

In addition to the operation teachings for FIG. 1A-1L, the embodiment of FIGS. 5A-5D adds the passively operated feature of a stabilizing mechanism to prevent transverse flexion and to promote efficient compression in storage devices 120 and 122, when those devices are in the form of a spring.

An embodiment of the present invention is illustrated in FIG. 6*a*. Among its distinguishing features, in addition to those of FIG. 1*a*-1*l*, are: the addition of an adaptation 702 of valve 108 enabling configurable control of fluid communication between bag 110 and two further objects, namely catheters 704 and 706; these catheters, respectively, forming adaptations 704a and 706a for coupling to a first and second part of a cardiovascular system, enabling blood from the first part to enter bag 110 through one catheter, and thence to be pumped out by the device of FIG. 1a-1l through the other catheter and into the second part of the cardiovascular system, the first part here providing the necessary force to compress storage devices 120 and 122 (although a motor may also be employed to provide or assist in providing such necessary force by operating an indexing device as described in FIG. 3A-3G).

Operation—FIG. 6a

In addition to the operation teachings for FIG. 1A-1L, the embodiment of FIG. 6a may be operated by: first taking measures to ensure that no air may be introduced into the organism's cardiovascular system by this embodiment; closing valve adaptation 702; coupling a first catheter (nominally, 704) to a first part of the cardiovascular system; coupling the second catheter (nominally, 706) to a second part of the cardiovascular system having a normal pressure equal to or lower than the first part; attaching sensors 708a to sense bolus imminence and conclusion, e.g., in multiple intervalvular locations of aorta; establishing an operating algorithm in controller 708 such that, on report of an imminent bolus, valve adaptation 702 will be configured to permit blood flow from the first catheter only into bag 110, and on report of conclusion of a bolus, valve adaptation 702 will be configured to permit blood flow only from bag 110 into the second catheter; storage 120 and 122 should be selected to require, for compression, a static pressure in bag 110 which is less than the pressure in the first part of the cardiovascular system.

An embodiment of the present invention is illustrated in FIGS. 7a-7g, inclusive. Key distinguishing features of this embodiment include: use of a single plate for a nominally vertical first partition 810 (as compared to the multiplate partition 118 of FIG. 1A-1L); a first opening 804 in housing 802 permitting first partition 810 to extend above the nominal top of housing 802; platform 806 is of such thickness along its nominal vertical axis as may deter departure of it from its illustrated rectilinear relationship with housing 802; in platform 806 is groove 808, specialized to slidably and retainably receive tongue 812 formed by partition 810, thus obliging partition 810 to move nominally vertically as platform 806 moves vertically; partition 810 forms a groove 814 slidably capturing a tongue 822 of second partition 818, obliging partition 818 to move nominally laterally as partition 810 moves laterally; second partition 818 forms a further tongue 820 on its nominal underside, slidably disposed in a groove 816 in the nominal top of housing 802, thereby securing continuous closure of opening 804 in the top of housing 802 as partition 810 moves nominally rearward; nominally behind partition 810 and above platform 806 is storage device 826 (shown in drawings as a spring), forming a slidable interface 826a with the nominal rear side of partition 810 and forming attachment 826b with an interior wall of housing 802, thereby enabling partition 810 to simultaneously compress storage device 826 and slide downwards; beneath platform 806 is storage device 824 (shown in drawings as a spring); opening 828 enables placement therein of valve 830, which in turn enables coupling of the opening 834 of bag 832 to valve 830, so that upon forceful introduction of a fluid into bag 832, platform 806 may be forced nominally downward and partition 810 may be forced nominally rearward, in order to store the fluid in a pressurized manner (this operates in reverse on opening valve 830 to release the stored fluid); plurality 836 of openings in housing 802 relieve pressure accumulations which would interfere with device operations; overall, these arrangements enable fluid discharge (or storage) at a substantially constant flow rate (or static pressure) over a spectrum of strain of storage devices 824 and 826.

Operation—FIGS. 7a-7g

The embodiment of FIGS. 7a-7g may be operated by: opening valve 830 and introducing a fluid therethrough into bag 832 until storage 824 and 826 are at least partially compressed, then closing valve 830; open valve 830 when ready to dispense the stored fluid.

An embodiment of the present invention is illustrated in FIGS. 8a-8d, inclusive. Among its distinguishing features, in addition to those of FIGS. 7a-7g, are: in general, its design enables use of a gas-filled balloon as storage device 826 by adding third partition 908 to secure as closed opening 804, with grooves 902 and 904 in the top of housing 802 capturing tongues 912 and 914 of partition 908, and groove 906 vertically disposed on the nominal rear wall of partition 810 capturing tongue 910 of partition 908; 826a is a slidable interface between storage device 826 (as a balloon) and an interior wall of housing 802; these arrangements prevent storage device 826 (as a balloon) from expanding upward through opening 804 and thereby disabling device operation.

Operation—FIGS. 8a-8d

The embodiment of FIGS. 8a-8d may be operated as described for the embodiment of FIGS. 7a-7g.

An embodiment of the present invention is illustrated in FIGS. 9a-9d, inclusive. Among its distinguishing features, in addition to those of FIGS. 7a-7g, are: an adaptation 1002 of valve 830 enabling configurable control of fluid communication between bag 832 and three further objects, namely ducts 1006, 1012, and 1016, these ducts being also coupled to tank 1008 which when containing a refrigerant fluid may be heated by a heat source 1026, thereby evaporating part of the refrigerant solution so that it may flow nominally upward through duct 1006 and exclusively into bag 832 (when valve 830 and its adaptation 1002 are configured therefor) and cause compression of storage devices 824 and 826; releasable self-locking devices 1004b and 1004d then lock storage devices 824 and 826 in a compressed position while the refrigerant solution vapor cools and condenses to liquid and returns to tank 1008, heat dissipation fins 1006a assisting in this process; the refrigerant solution would then be heated again at a temperature to fractionally distill the refrigerant from solution and send it as vapor up through duct 1012 and exclusively into bag 832 (when valve 830 and its adaptation 1002 are configured therefor, and when valve 1010 is open), with dessicant 1014 in duct 1012 acting to partially dry the refrigerant vapor; storage devices 824 and 826 are then unlocked and compress the refrigerant vapor to liquid form exclusively inside bag 832 (when valve 830 and its adaptation 1002 are configured therefor) and subsequently force that liquid out and exclusively into duct 1016 (when valve 830 and its adaptation 1002 are configured therefor) and thence through expansion valve 1016a into a further part of duct 1016 (cooling coil), in the process causing the refrigerant to assume a gaseous state; the gaseous refrigerant is then bubbled back through a plurality 1016b of holes in duct 1016 into the refrigerant solution inside tank 1008, and the process may thereafter be renewed; sensor 1022 determines pressure and temperature in bag 832 and tank 1008 and transmits this data via conduit 1022a to controller 1024, which acts to control valve adaptation 1002, valve 830, valve 1010, releasable self-locking devices 1004b and 1004d, and heat sources 1026; heat source 1026 may also be applied to duct 1012 to dry dessicant 1014.

Operation—FIGS. 9a-9d

In addition to the operation teachings for FIGS. 7a-7g, the embodiment of FIGS. 9a-9d may be operated by: placing a predetermined quantity of refrigerant solution in tank 1008; thereafter, controller 1024 should be programmed with the following steps: close valve 1010; configure valve adaptation 1002 to permit fluid exchange between tank 1008 and bag 832; apply heat to tank 1008 to induce compression of storage 824 and 826 until self-locking devices 1004b and 1004d engage; upon sensor 1022 reporting temperature and pressure conditions at which most of vapor in bag 832 (and in duct 1016) is presumed to have cooled and condensed to liquid (permitting its return to tank 1008), open valve 1010; configure valve adaptation 1002 to permit fluid exchange between tank 1008 and bag 832 through duct 1012 only; apply heat to tank 1008 at a temperature favorable to vaporization of the refrigerant fraction of the refrigerant solution, but not as favorable to vaporization of any other component(s) of the refrigerant solution; upon sensor 1022 reporting temperature and pressure conditions at which a maximum (or other predetermined amount) amount of refrigerant vapor is presumed to be present in bag 832, close valve 830; release self-locking devices 1004b and 1004d (thereby compressing refrigerant vapor to liquid); configure valve adaptation 1002 to permit fluid exchange only between bag 832 and duct 1016; upon detection of pressure and temperature low enough in tank 1008 to permit re-introduction of refrigerant thereinto, open valve 830 (causing intense cooling in a part of duct 1016) until temperature and pressure in tank 1008 indicate that discharge of refrigerant from bag 832 has ended; apply heat to dessicant 1014 region of duct 1012 to induce dessicant 1014 drying, then close valve 1010; allow system to cool and return to original ground state of temperature and pressure, then repeat above sequence.

An embodiment of the present invention is illustrated in FIG. 10a. Among its distinguishing features, in addition to those of FIG. 7a-7g, are: a further opening 1102 in housing 802, disposed in which is a transparent plate 1104 forming an attachment 1106 with housing 802, thereby enabling viewing of internal operations of the device for educational use.

Operation—FIG. 10a

In addition to the operation teachings for FIGS. 7a-7g, the embodiment of FIG. 10a may be operated by: permitting students, researchers, and other users to view internal operations of the device through transparent plate 1104.

An embodiment of the present invention is illustrated in FIG. 11a. Among its distinguishing features, in addition to those of FIGS. 7a-7g, are: an adaptation 1202 of valve 830 enabling configurable control of fluid communication between bag 832 and two further objects, namely air compressor 1204 and duct 1206; duct 1206 forms expansion valve 1208; sensor 1214 senses the pressure and volume of air remaining in bag 832 and reports this data to controller 1218 via conduit 1216; controller 1218 forms data conduit 1224 for coupling to computing apparatus 1210 to enable receipt of temperature data relating to computing apparatus 1210 parts; using the foregoing data, controller 1218 acts through adaptations 1220 and 1222 to control operation of valve 830 adaptation 1202 and compressor 1204 to provide necessary cooling to computing apparatus 1210.

Operation—FIG. 11a

In addition to the operation teachings for FIGS. 7a-7g, the embodiment of FIG. 11a may be operated by: providing the operating system of the computing apparatus 1210 with instructions enabling recognition of controller 1218, and directing that data relevant to the temperature(s) of hardware of computing apparatus 1210 be transmitted to controller 1218; coupling data conduit 1224 to a part of computing apparatus 1210 such that controller 1218 may be recognized thereby and may receive the aforementioned data. Controller 1218 should be programmed with the following steps and conditional steps: (1) upon receipt of data indicating that hardware temperature in computing apparatus 1210 exceeds a predetermined threshold (overheating), and only if pressurized air is reported as present in bag 832, configure adaptation 1202 to permit air flow from bag 832 into duct 1206 until a predetermined temperature is reached, then close valve 830; (2) if, at the time of such report of overheating, pressurized air is reported as not present in bag 832, then configure adaptation 1202 to permit receipt of pressurized air from compressor 1204 by bag 832 and commence operation of compressor 1204 until a predetermined pressure and volume are reached in bag 832, then end operation of compressor 1204 and execute step 1; (3) at any time, if air flow from bag 832 into duct 1206 is not then being permitted, and if air volume in bag 832 is below a predetermined amount, configure adaptation 1202 to permit receipt by bag 832 of pressurized air from compressor 1204 and commence operation of compressor 1204 until such volume is reached, then end compressor 1204 operation; (4) if temperature in hardware of computing apparatus 1210 is reported above a predetermined emergency threshold, then configure adaptation 1202 to direct pressurized air from compressor 1204 into duct 1206 and commence operation of compressor 1204 until a predetermined temperature is reached, then end compressor operation.

An embodiment of the present invention is illustrated in FIGS. 12a-12b, inclusive. Among its distinguishing features, in addition to those of FIGS. 7a-7g, are: an adaptation 1302 of valve 830 enabling configurable control of fluid communication between bag 832 and two further objects, namely ducts 1306 and 1318; on sufficient heating of a fluid in reservoir 1308, that fluid is forced into bag 832 (when valve 830 and its adaptation 1302 are configured therefor), thereby compressing storage devices 824 and 826, that fluid then being stored under pressure by closing valve 830; when power is needed to operate shaft 1316, with its adaptation 1316a to connect to a work object, valve 830 is opened and its adaptation 1302 is configured to direct the pressurized fluid exclusively to actuator 1314; spent fluid recycles to reservoir 1308 via duct 1312; relief valves 1304 and 1310 prevent excess pressure buildup in bag 832 and reservoir 1308, respectively.

Operation—FIGS. 12a-12b

In addition to the operation teachings for FIGS. 7a-7g, the embodiment of FIG. 12a-12b may be operated by: removing relief valve 1310, adding a predetermined amount of fluid to reservoir 1308, then replacing relief valve 1310; configuring valve 830 adaptation 1302 to permit fluid flow only between bag 832 and reservoir 1308; heating reservoir 1308 to proximally induce compression of storage 824 and 826; closing valve 830 until fluid energy is needed; when fluid energy is needed, configuring valve 830 adaptation 1302 to permit fluid flow only between bag 832 and actuator 1314.

An embodiment of the present invention is illustrated in FIGS. 13a-13e, inclusive. Among its distinguishing features, in addition to those of FIGS. 7a-7g, are: inside housing 1402 a pair of non-parallel walls having nominally horizontal (with respect to FIG. 13a) grooves 1412 and 1414 slidably capture, respectively, tongues 1416c and 1416d formed, respectively, by plates 1416e and 1416f of partition 1416; in opening 1404 is disposed valve 1406, which is coupled to opening 1410 of bag 1408; forcible introduction of fluid into bag 1408 results in compression of storage device 1418 (secured to interior of housing 1402 at 1418b, and having a slidable interface 1418a with partition 1416); plates 1416e and 1416f have a tongue 1416b and groove 1416a relationship, enabling slidable expansion of partition 1416 on application of fluid force acting through bag 1408 as bag 1408 expands (operating in reverse with valve 1406 open and storage device 1418 expanding); plurality of openings 1420 prevent accumulation of air pressure which would otherwise interfere with device operation; these arrangements enable storage of a fluid under pressure in bag 1408, and dispensing therefrom at a substantially constant flow rate (or static pressure) over a spectrum of strain of storage device 1418 under conditions when the orthogonal surface area of partition 1416 facing bag 1408, at the time of partition 1416 first contacting fully expanded storage device 1418, is substantially half that of its orthogonal surface area facing said bag 1408 when said bag 1408 has proximally caused compression of storage device 1418 to half its elastically deformable limit.

Operation—FIGS. 13a-13e

The embodiment of FIGS. 13a-13e may be operated by: opening valve 1406 and introducing a fluid therethrough into bag 1408 until storage 1418 is at least partially compressed, then closing valve 1406; open valve 1406 when ready to dispense the stored fluid.

An embodiment of the present invention is illustrated in FIG. 14a. Among its distinguishing features, in addition to those of FIGS. 13a-13e, are: an adaptation 1502 of valve 1406, enabling separate coupling to valve 1406 of an additional bag 1504 at its opening 1504a and enabling configurable fluid communication between bag 1504, bag 1408, and valve 1406; this arrangement further enables storage and dispensing of two different fluids simultaneously at virtually identical pressures.

Operation—FIG. 14a

In addition to the operation teachings for FIGS. 13a-13e, the embodiment of FIG. 14a may be operated by: configuring adaptation 1502 of valve 1406 to permit introduction of fluid into bag 1408 until storage 1418 is partially compressed, then configuring it to permit introduction of fluid into bag 1504 in a predetermined amount, then closing valve 1406; open valve 1406 when ready to dispense the stored fluid(s), jointly or severally.

An embodiment of the present invention is illustrated in FIG. 15a. Among its distinguishing features, in addition to those of FIGS. 13a-13e, are: an adaptation 1602 of valve 1406 enables configurable control of fluid communication between bag 1408 and two further objects, namely ducts 1604 and 1614, and enables operation of valve 1406 by an electrical impulse; storage device 1418 is armed (compressed) by electrically operated indexing device 1628; fluid is pumped into bag 1408 from reservoir 1610 by electrically operated impeller 1606 through duct 1604; when starting power for a combustion engine (with which this embodiment may be made integral) is later needed, the device of FIG. 13a-13e forces fluid out through duct 1614 into the fluid intake port 1618 of a fluid driven electrical generator 1616, which sends spent fluid out through its output port 1622 into duct 1620, which empties into reservoir 1610.

Operation—FIG. 15a

In addition to the operation teachings for FIGS. 13a-13e, the embodiment of FIG. 15a may be operated by: installing the embodiment in a location where it may provide starting power to a combustion engine; operably coupling valve adaptation 1602, indexing device 1628, and impeller 1606 to a power source (such as an alternator integral with the engine); uncoupling duct 1620 from reservoir 1610 and adding a predetermined amount of hydraulic fluid to reservoir 1610, then re-coupling duct 1620 to reservoir 1610; operably coupling generator 1616 to the usual starting mechanism of the engine in a way as may furnish starting power; operably coupling a user control panel to valve adaptation 1602, indexing device 1628, and impeller 1606 in a manner to permit selective user operation of these elements. In lieu of a user control panel, operably deploy a programmable controller system (with sensors), the controller operating substantially according to the following algorithm: (1) upon sensors reporting a user attempt to start the engine, if bag 1408 contains pressurized fluid, configure valve adaptation 1602 to permit fluid flow only between bag 1408 and generator 1616 until starting attempt ends, then close valve adaptation 1602; (2) at any time, other than during starting of engine, if sensors report fluid in bag 1408 to be less than a predetermined amount, configure valve adaptation 1602 to permit fluid flow only between impeller 1606 and bag 1408, arm storage 1418 using indexing device 1628, turn impeller 1606 on to pump fluid into bag 1408 until a predetermined amount of fluid is therein, then close valve adaptation 1602, turn off impeller 1606, and release storage 1418 from indexing device 1628.

An embodiment of the present invention is illustrated in FIGS. 16a-16b, inclusive. Among its distinguishing features, in addition to those of FIGS. 13a-13e, are: fluid reservoir 1702, coupled to valve 1406 at opening 1706 by duct 1712; piston 1708 slidably disposed in reservoir 1702 through opening 1704 and forming adaptation 1710 to enable coupling to a further object so that the device may provide energy absorption when a gas or liquid is present in sufficient quantity in reservoir 1702 and in bag 1408 with valve 1406 open.

Operation—FIGS. 16a-16b

In addition to the operation teachings for FIGS. 13a-13e, the embodiment of FIGS. 16a-16b may be operated by: installing appropriate seals in opening 1704 and a retention device on the part of piston 1708 which is within reservoir 1702; uncouple opening 1706 from duct 1712 and fill bag 1408 and reservoir 1702 with predetermined amounts of fluid (gas or liquid) while piston 1708 is extended a predetermined distance outside reservoir 1702; re-couple opening 1706 to duct 1712; deploy reservoir 1702 in a substantially fixed position relative to the object to which adaptation 1710 is intended to be attached, e.g., part of the frame of a conveyance or a suspension part; attach adaptation 1710 to the above object. In some instances, such as in a bridge support or train coupling, adaptation 1710 may form a responsive interface rather than a coupling with some underlying material.

An embodiment of the present invention is illustrated in FIG. 17a. Among its distinguishing features, in addition to those of FIGS. 13a-13e, are: an adaptation 1802 of valve 1406 enables control of fluid communication between bag 1408 and the output line 1804 of an air pump supplying compressed air to the air tank of an air-driven conveyance; an adaptation 1806 of valve 1406 enables control of fluid communication between bag 1408 and the air supply port 1808 of an air-driven actuator used to supply motive power to an air-driven conveyance; these arrangements enable compressed air storage and dispensing for an air-driven conveyance at a substantially constant static pressure and rate of flow.

Operation—FIG. 17a

In addition to the operation teachings for FIGS. 13a-13e, the embodiment of FIG. 17a may be operated by: deploying this embodiment in an air-driven conveyance; closing valve adaptation 1806; coupling the output line of an air pump to valve adaptation 1802 and opening it, then operating the air pump to introduce a predetermined amount of air into bag 1408, then closing valve adaptation 1802 and uncoupling it from the air pump output line; coupling valve adaptation 1806 to supply port 1808, then opening valve adaptation 1806 when power to the conveyance is desired.

An embodiment of the present invention is illustrated in FIG. 18a. Among its distinguishing features, in addition to those of FIGS. 13a-13e, are: an adaptation 1902 of valve 1406 enables configurable control of fluid communication between bag 1408 and two further objects, namely catheters 1904 and 1908, which are coupled to adaptation 1902 and which form at their distal ends, respectively, adaptations 1906 and 1910 for coupling to part(s) of the cardiovascular system of an organism; a controller 1912 operably coupled to adaptation 1902 and forming sensors 1912a; these arrangements enable bypass of blood around part(s) of the cardiovascular system.

Operation—FIG. 18a

In addition to the operation teachings for FIGS. 13a-13e, the embodiment of FIG. 18a may be operated by: first taking measures to ensure that no air may be introduced into the organism's cardiovascular system by this embodiment; closing valve adaptation 1602; coupling a first catheter (nominally, 1904) to a first part of the cardiovascular system; coupling the second catheter (nominally, 1908) to a second part of the cardiovascular system having a normal pressure equal to or lower than the first part; attaching sensors 1912a to sense bolus imminence and conclusion, e.g., in multiple intervalvular locations of aorta; establishing an operating algorithm in controller 1912 such that, on report of an imminent bolus, valve adaptation 1602 will be configured to permit blood flow from the first catheter only into bag 1408, and on report of conclusion of a bolus, valve adaptation 1602 will be configured to permit blood flow only from bag 1408 into the second catheter; storage 1418 should be selected to require, for compression, a static pressure in bag 1408 which is less than the pressure in the first part of the cardiovascular system.

An embodiment of the present invention is illustrated in FIGS. 19a-19b, inclusive. Among its distinguishing features, in addition to those of FIGS. 13a-13e, are: a tire rim 2002 of a conveyance, attached to which is the device of FIGS. 13a-13e; a duct 2008 coupling valve 1406 to an opening 2004 in the rim in a manner to permit fluid communication between bag 1408 and, when mounted, the interior of a tire 2006.

Operation—FIGS. 19a-19b

In addition to the operation teachings for FIGS. 13a-13e, the embodiment of FIGS. 19a-19b may be operated by: opening valve 1406; mounting a tire on rim 2002; introducing air in a predetermined amount into the tire through valve 2003; introducing air in a predetermined amount into the device of FIGS. 13a-13e through valve 2009 and therefore into bag 1408; mount rim 2002 on a conveyance. The device of FIGS. 13a-13e selected should be one having a piezoequilibrated pressure exceeding that of optimum tire pressure. In lieu of passively using the automatic refill feature of valve adaptation 2007, an open system may be used, i.e., one in which valve adaptation 2007 permits continuous fluid communication between bag 1408 and the interior of the tire, thereby allowing the device of FIGS. 13a-13e to provide shock absorption for the tire and a smoother ride. But such a use involves a complex set of issues, including: the optimum pressure and volume of air in the tire, the maximum volume of air and pressure in the device of FIGS. 13a-13e (up to its elastic limit), the desired amount of air to be in reserve, and the thermodynamic interplay between these factors. Elasticity of the tire, though usually minimal, may also be a factor. The device of FIGS. 20a-20b is discussed in Alternative Embodiments and adds further to user options.

SUMMARY DEFINITIONS OF TERMS

For the convenience of the public in understanding the invention, summary definitions of some of the terms used in this application are here provided, though these summary definitions are only by way of illustration and should not be construed as limiting the claims or as barring expanded definitions under any doctrine of equivalents:

actuator element refers to any device for receiving fluid force and converting it to motion, such as but not limited to that appearing in FIG. 12b; combustion engine element refers to any engine using combustion of a fuel and oxidizer to generate energy; controller element refers to any device capable of exercising selective control over an element of another device; impeller element refers to any device for forcibly moving a fluid through a duct; index, indexing element refers to any device capable of causing the motion of part(s) of an object relative to itself or of causing the motion of an object relative to a further object, such as but not limited to that appearing in FIGS. 3c, 3d, and 3e (specifically, it refers to any device for proximally causing compression of one or more elastically deformable elements, i.e., storage devices); partition element refers to a single panel or plate or series of expansively cooperating panels or plates, such as but not limited to that appearing in FIGS. 1b-1l, inclusive, FIGS. 7b-7c, inclusive, and 13b-13d, inclusive; piezoequilibration refers to the phenomenon of a constant pressure being exhibited by a fluid proximally acting against an elastic member, without regard to the degree of deformation of that member within its elastic limits; relief valve element refers to a valve designed to open only when a predetermined pressure is reached or exceeded; retainer element refers to a rigid plate for covering an opening, together with a mechanism for securing the plate in place, such as but not limited to that appearing in FIG. 3a; (releasably) self-locking element refers to a device enabling the securing of an elastically deformable element in a predetermined position, such as but not limited to that appearing in FIGS. 2c-2h, inclusive; spring element refers to any solid and elastically deformable material to which a force may be applied in a particular direction in order to store energy therein, such as but not limited to an elastically deformable metal or polymeric coil, or piece of rubber (being stretched or compressed) or other elastomer; storage, except for its common usage in the application, refers to any substantially elastically deformable material, such as but not limited to a spring or gas, or carbon nanotubes, or any arrangement of a piston sealably fitted to an object for containing a gas; valve element refers to any device acting to substantially regulate the flow of a fluid past an opening, such as but not limited to a stop valve, globe valve, ball valve, needle valve, or check valve.

Theory of Operation

The essence of the theory of the present invention has three components: the omnidirectional force of a fluid under pressure; the nature of forces in an elastically deformable material; and the relationship of total area of a solid surface to total force applied to it by a fluid under pressure.

When a fluid under pressure impinges upon the surface of a solid, in this case through the intermediary of a flexible bag, it exerts on that surface a total force represented by the product of the area of that surface and the pressure of that fluid. If movement of that surface as caused by that fluid is resisted by an elastic material, and if the fluid side of that surface is capable of steadily expanding, then the total force exerted on the elastic material will be steadily increased. Piezoequilibration, however, requires one of two further conditions.

The first condition which will produce piezoequilibration is that, if using a single surface, as in the case of the embodiment of FIGS. 13a-13e, the surface must expand at a rate consistent with Hooke's law; for example, upon it compressing the elastic material by half its compressible limit, it should have a surface area twice what it had when first starting to compress the elastic material. This means that from the start of compression to at least the halfway point, substantial piezoequilibration will exist; continued piezoequilibration requires that the surface area expansion must continue as the same linear function which brought the surface area to twice its original value.

Alternatively, a second condition which will produce piezoequilibration is one in which a second expandable surface and elastic material are employed, simultaneously with the first, as in the cases of the embodiments of FIGS. 1A-1L and FIGS. 7a-7g. In such a system, the fluid will of course at all times apply equal force per unit area, i.e., equal pressure, to both expandable surfaces. Or, put another way, the surfaces, driven by their underlying elastic materials, will at all times cause an omnidirectional pressure to develop in the fluid. Moreover, until one of the elastic materials reaches its limit of deformation, pressure in the fluid will remain constant due to the simultaneous effects of expansion of both surfaces and continuing compression of both elastic materials.

Thus the theoretical key to piezoequilibration is a fluid acting through the medium of one or more solid surfaces experiencing analog surface expansion and acting upon one or more elastic members (except as later discussed in Alternative Embodiments).

The simplest example involves the case of a pair of springs A and B of equal strength and length. Let us assume that, at maximum compression of these springs, they each exert 500 pounds, and that each expandable surface then has an area of 10×10 inches (100 sq-ins) exposed to the bag containing the fluid. It is then easy to see that fluid pressure will be 500/100, or 5 psi. Now let us release some of the fluid through the valve until the two walls are of dimensions 5×10 inches (50 sq-ins), which in turn means that the springs are half expanded (or half compressed) and they each now exert 250 pounds, and we thus have a fluid pressure of 250/50, or 5 psi (as before). Now let us open the valve and release more fluid, until each wall has a surface area of 2.2×10 inches (22 sq-ins), meaning that the springs are only 22% compressed, so they each now exert 110 (0.22×500) pounds of force each, and therefore we have a fluid pressure (again) of 5 psi (110/22). Unequal springs behave similarly to achieve an equilibrium constant of static pressure. Thus the invention creates the useful result that fluid stress is a constant while mechanical strain is dynamic. The invention arose from prayer and reflection, at the end of which the lower case gamma presented before the inventor, suggesting two forces acting at right angles to each other, which in a mathematical sense is analogous to the present invention. In essence, the varying embodiments of the present invention rely upon the principle of using at least one fluid-driven, dimensionally variable, solid interface to keep pace with dynamic stress in one or more resilient members.

Additional Embodiments

Not Applicable

Alternative Embodiments

Although omniplanar rigidity of materials for platforms and partitions is presently preferred by the inventor, there may also be suitable non-rigid materials having certain advantages. Materials having substantial monoplanar elasticity may offer advantages in terms of ease of fabrication, configurability, and perhaps lower cost. For example, a sheet of rubber or polymer having rigid embedded reinforcing rods parallel to the plane of the sheet can, in an appropriate configuration, result in substantial monoplanar elasticity in the same plane. The tradeoff in use of such materials (or even simple rubber sheets), however, is their influence on the basic piezoequilibration equations, i.e., their deformation adds increasing force (friction) to any tongue/groove interface; such a force (resistance to movement of the partition) can become greater than the force required to compress the storage device per se, resulting in piezoequilibration nullification. The partial remedy in such case is to provide tongue/groove interfaces which are as nearly friction-free as possible. Note that the present invention's tongue/groove interfaces, while not friction-free, do provide a constant tribological value, as there is no change in force applied to the interface, increased forces being dissipated, or negatived, by additional tongue/groove interfaces (the bag/partition interface is not tribologic, or only negligibly so).

These considerations also raise the notion of an alternative embodiment in which we may dispense with the present storage devices entirely and rely instead on a single sheet of a monoplanar elastomer, or for that matter, any elastomer, as an expandable partition. In such use, using an embodiment similar to FIGS. 13a-13e, one need only integrate its elastic function (Hooke's law) with its tribologic function to determine a piezoequilibrative relationship (angle) formed by the walls within which are embedded the tongue/groove interfaces, which may in some instances require that at least one wall be non-linear, or curved.

Use of the invention in submersibles to provide quieter power disclosed in [t] of Objects and Advantages deserves further discussion as an alternative embodiment of the invention. What is conceived is that a power source integral with the submersible, e.g., electrical power, or an external power source, be used to compress the storage devices and water thereafter admitted to the bag of the invention, the water subsequently being expelled by the invention to provide motive power for the submersible, resulting in quieter operation than with conventional motors. This embodiment would be specially useful in marine research of sound-sensitive marine-dwelling fauna.

A further alternative embodiment concerns FIGS. 19a and 19b teaching attachment of the present invention to a tire rim 2002 and coupling a duct 2008 to its valve 1406 and to an opening 2004 in the tire rim 2002, although the language elsewhere in the application is much broader and in fact encompasses the alternative embodiment described below. Although the embodiment of FIGS. 19a and 19b is preferable for its simplicity, other embodiments also have advantages.

For example, the embodiment shown in FIGS. 20a and 20b has the advantages of enabling use of an embodiment of the present invention much larger than the tire rim itself, enables use of a single large embodiment of the present invention to serve all tires of the conveyance, and reduces risk of system damage from external sources. For a leaking tire, a larger embodiment of the present invention extends the time before which the tire must be refilled with air or repaired; this can also translate into greater safety. System damage risk is reduced by having less of the embodiment exposed to hazard. Duct 2008 technically extends as a single duct, but in various presentations: from valve 1406 it proceeds into a brief area bounded by a rotatable seal 2008a within an axial tunnel 2008b of axle 2012; duct 2008 is then bounded only by the axial tunnel 2008b of axle 2012 until reaching rotatable seal 2008c, which then becomes the boundary of duct 2008; the duct then continues as 2008d, until finally penetrating rim 2002 at opening 2004. Added only for illustration purposes are tire 2006, part of conveyance 2016, and protective hubcap (wheelcover) 2014.

An alternative embodiment of FIGS. 4A-4G holds out the promise of improved aircraft safety and lowered engine construction costs. Most modern aircraft engines use a compressor in some form to increase the volume of air delivered to the combustion chamber. There are many and complex varieties of these systems, often simply referred to as turbines. Hazards associated with jet engine turbines include high-speed entry of foreign objects into the forward end of the engine, thereby damaging the turbine and disabling the engine. Such hazards can be eliminated through employment of a plurality of large embodiments of the present invention to supply compressed air to the combustion chamber, thereby permitting the engine's forward end to be designed as closed. As needed, some fuel is burned to index the storage elements, with forward vents on the aircraft admitting air to inflate their bags, the vents having protective screens (which are not practicable for turbines); the valves are then closed to air intake, the storage elements released to create a body of compressed air, and the valves opened to deliver compressed air to combustion chambers.

An alternative embodiment relating to footwear would be integration of the device of FIGS. 13a-13e with a shoe 3102 to provide enhanced comfort and shock absorption. In such an embodiment, as in FIGS. 21a and 21b, one or more air-filled (or liquid-filled) sacs 3104 embedded in the sole 3102a of the shoe would be coupled at air sac 3104 openings 3106 therein to valve 1406 of the device of FIGS. 13a-13e, also embedded in the sole of the shoe. Materials for fabrication of this embodiment could be almost completely of plastic, making it affordable to manufacture and market.

Advantages

The chief scientific advantage of the present invention is the combining of Hooke's law with principles of fluidics and geometry to construct piezoequilibrative systems. Reduced to practice, this advantage translates to many areas.

Practical energy storage in an elastic element is one such benefit. For example, when an alternative or conventional energy system has excess energy supply, that excess may be converted to fluidic energy and stored for later use with far greater efficiency than in the prior art, which has included batteries, pumped storage, chemical conversion, and compressed gases. Further, the present invention eliminates the wastefulness of fabricating overdesigned fluid containers. For example, a compressed-gas cylinder is designed to safely contain a gas at, say, 1200 psi, and therefore has a wall thickness to meet that goal. But, the true work potential of that gas is related only to a pressure of 600 psi, i.e., the average of pressure of the gas when first being discharged and when completely used up. Thus, the extra wall thickness to accommodate 1200 psi is wasted, the advantage of the present invention being that it could have contained the same amount of gas at a constant 600 psi, having the same work potential, and thereby saved the cost of a thicker container. Put a different way, the present invention can store twice as much compressed gas at a given pressure as can a conventional gas container, of the same size, using that pressure as a maximum. Use of the present invention for storage of a pressurized liquid, as compared to storage in a traditional container using an elastic element, also results in the advantage of thinner container walls, in addition to increased work potential for equal volumes of pressurized liquid stored.

Further advantages, some noted in more detail elsewhere in this application, include, but are not limited to:

(a) reduction in atmospheric pollution related to propellant gases used in dispensers;
(b) improved safety, convenience, and reliability in blood and medicament delivery;
(c) virtual elimination of RBC damage in extracorporeal blood circulation procedures;
(d) increased reliability of fuel supply in aerospace craft;
(e) improved energy storage for cryonucleators;
(f) enhanced cardiac-assist equipment, with virtual elimination of RBC damage;
(g) provision of a refrigeration system for developing regions, permitting locally available wood or sunlight to be used as a power source, thereby enhancing environmental quality and health;
(h) offer of an educational device for direct observation of phenomena in physics, chemistry, fluidics, and mathematics;
(i) quieter cooling of computers and their accessories;
(j) generation and storage of energy in developing regions using local fuels;
(k) enabling storage of two fluids at identical pressures, which may be simultaneously dispensed at identical pressures;
(l) providing a new power source for the starting system of a combustion engine, thus reducing pollution related to batteries and enhancing environmental quality;
(m) providing a shock absorption system with more desirable stress characteristics;
(n) greatly enhanced mileage for air-driven conveyances, thereby also enhancing environmental quality;
(o) enabling improved operating and maintenance characteristics for tires;
(p) enabling development of exercise equipment and prosthetic appliances with a constant stress profile across a given range of stroke, thereby making such equipment and appliances safer and more efficient to use;
(q) enabling development of bedding, seating, foot-covering, and floor-covering structures to provide greater comfort and stability, and;
(r) providing a quieter propulsion system for submersible craft.

The advantages above cited are by way of example and not limitation; further advantages should be determined by the claims and drawings, and their legal equivalents.

CONCLUSION, RAMIFICATIONS, AND SCOPE

From the foregoing application and its appended claims and drawings, it is clear that the present invention offers significant resolution to many current problems relating to energy storage, improvement of environmental quality, aerospace safety, and medicine. Its implications for nearly every industry are broad and penetrating, as has already been discussed.

The presumed or apparent size of embodiments presented herein may be modified without altering any essential functions of the present invention; sizes of elements relative to one another may be modified without altering any essential functions of the present invention; as well, shapes of elements may be modified without altering any essential functions of the present invention provided that such shapes produce results consistent with piezoequilibrative principles of the invention as described herein.

Certain elements of the present invention may be reversed in position with respect to external or internal location relative to a housing. For example, but not by way of limitation, storage elements presently depicted and described as within the housing may be externalized by use of a rod, attached at one end to a partition or platform within the housing, passing through a wall thereof, and attached (or impinging) at its other end to a storage element outside the housing, the storage element being coupled to the housing by a bracket in a manner to permit its deformation by movement of the rod.

Releasably self-locking mechanisms are presented mainly as mechanical constructs, but these may also be of other types, including but not limited to electromagnetic devices. Indexing elements are presented in the drawings partly as bolt-and-nut devices, but these may assume such other forms as, but not limited to, ratchet-and-pawl assemblies, and cable-and-spool assemblies.

Although specific construction materials have often not been specified, it is clear that their selection will depend on the particular application, and due consideration should therefore be given to such factors as the nature and magnitude of stressors which may act upon such materials, including fluidic, mechanical, chemical, electromagnetic, and thermal stressors. In general, however, though not by way of limitation, the inventor presently prefers: for large flat surfaces, the use of metals such as steel or aluminum; for springs, metal; for air-containing or water-containing bags, plastic of thickness adequate to avoid entrainment between surfaces; for bags containing hydraulic fluid, plastic of thickness adequate to avoid entrainment between surfaces and resistant to damage by hydraulic fluid; for rod-like structures, metals such as steel or aluminum; valves, selected according to application; other elements, materials selected according to application.

Though not essential to the invention, the present invention can benefit from lubrication of interior surfaces and the addition of sweeper blades to platform and partition, as a way to make for smoother operation and to prevent bag entrainment between surfaces.

Descriptions in this application contain many specificities, and these should not be construed as limiting the scope of the invention but as illustrations of its presently preferred embodiments. Therefore, the scope of the invention should be determined by the appended drawings and claims and their legal equivalents, rather than merely by the examples given.

The inventor claims:

1. A device utilizing, in part, elastically deformable members for releasably storing a pressurized fluid such that pressure in said fluid, when said fluid is not flowing, may be substantially the same across a range of deformation of said deformable members, comprising:
    [a] a substantially rigid housing, forming left, right, top, bottom, front and rear walls;
    [b] a substantially rigid platform, forming left, right, top, bottom, front and rear surfaces, at least a part of said left, front, and rear surfaces thereof substantially and slidably conforming, respectively, to said left, front, and rear walls of said housing, disposed within said housing;
    [c] a sealable first opening in said housing;
    [d] a first valve for regulating flow of said pressurized fluid, sealably disposed in said sealable first opening such that it may regulate said flow;
    [e] a flexible and substantially nonpermeable bag for containing said pressurized fluid, disposed within said housing above said platform, forming an opening sealably coupled to said first valve such that said first valve may regulate flow of fluid into and out of said bag;
    [f] a first groove, disposed in said top surface of said platform, said first groove adapted to slidably and retainably receive a tongue;
    [g] a second groove, parallel to said first groove, disposed in said top wall of and within said housing, said second groove adapted to slidably and retainably receive a tongue;
    [h] a partition for creating a chamber of variable size within said housing, at least one part thereof forming a first tongue slidably and retainably disposed in said first groove, and at least one part thereof forming a second tongue slidably and retainably disposed in said second groove, such that displacement of said platform may result in dimensional change of said partition along its expandable axis, further such that fluid entering said bag may forcibly cause displacement of said partition, said partition further adapted such that it may maintain a substantially closed chamber formed by it, a part of said platform, and part of said walls of said housing;
    [i] a first storage member for releasably storing mechanical energy, selected from among a class of mechanical energy storage devices using an elastically deformable material as a storage element or using compression of a gas as a storage element, disposed within said housing in a space substantially bounded by a side of said partition facing away from said bag, by said housing, and by said platform, further disposed such that it may releasably store mechanical energy from a force applied towards said first storage member by said bag, said first storage member further forming substantially slidable interfaces with elements within said housing such that said first storage member may permit vertical movement by said partition or forming at least one attachment and at least one slidable interface with elements within said housing such that said first storage member may permit vertical movement by said partition;
    [j] a second storage member for releasably storing mechanical energy, selected from among a class of mechanical energy storage devices using a spring as a storage element or using compression of a gas as a storage element, disposed within said housing in a space substantially bounded by said bottom surface of said platform and by part of said housing, further disposed and adapted such that upon application of force to said top surface of said platform said second storage member, across at least a part of its range of deformation, may begin to significantly deform at a time when said first storage member is significantly deforming, further disposed such that it may releasably store mechanical energy from a force applied in its direction by said bag, and;
    [k] a plurality of further openings in said housing, disposed and adapted such that they may relieve pressure accumulation in any fluid which is within said housing but which is external to fluid within said bag, and external to any pressurized parts of said first and second storage member.

2. The device of claim 1, wherein at least a part of at least one wall of said housing forms a closable opening, such that replacement of said bag and said first valve may be facilitated and such that said partition and said platform may be accessed in order to apply force to said partition and said platform in order to compress said first and second storage members, further comprising:
    [a] an adaptation of said first valve capable of sealably coupling to a medicament delivery or blood delivery line;
    [b] a rigid plate, disposed in said closable opening in such manner as may close said closable opening;

[c] a retainer for releasably retaining said plate in a position of closing said closable opening, forming an attachment with said housing such that it may, as preferred by an operator of said retainer, alternately retain and release said plate from said position of closing said closable opening;

[d] a first self locking mechanism for releasably locking said first storage member in a compressed position, forming an operable engagement with said first storage member such that it may, as preferred by an operator of said first self locking mechanism, alternately lock said first storage member in a compressed position and release it from a compressed position, and;

[e] a second self locking mechanism for releasably locking said second storage member in a compressed position, forming an operable engagement with said second storage member such that it may, as preferred by an operator of said second self locking mechanism, alternately lock said second storage member in a compressed position and release it from a compressed position.

3. The device of claim 1, further comprising:

[a] an adaptation of said first valve enabling its coupling to an oxygenation part of an extracorporeal blood circulating device, such that it may selectively admit blood from said circulating device into said bag and permit blood to be forcibly discharged from said bag to a further object;

[b] an access hole in at least part of at least one wall of said housing, such that replacement of said bag and said first valve may be facilitated;

[c] a rigid plate, disposed in said access hole in such manner as may close said closable opening;

[d] a retainer for releasably retaining said plate in a position of closing said closable opening, forming an attachment with said housing such that it may, as preferred by an operator of said retainer, alternately retain and release said plate from said position of closing said closable opening;

[e] a first indexing device for releasably compressing said first storage member, said first indexing device operably coupled to said first storage member to facilitate releasably compressing said first storage member, and;

[f] a second indexing device for releasably compressing said second storage member, said second indexing device operably coupled to said second storage member to facilitate releasably compressing said second storage member.

4. A plurality of the device of claim 1, further comprising:

[a] an adaptation of said first valve capable of alternately permitting and preventing fluid communication between said bag and individual ducts among a plurality of ducts;

[b] a plurality of ducts, a duct of said plurality of ducts sealably coupled at one end to said adaptation of said first valve and adapted to be coupled at its other end to a fuel tank of an aerospace craft such that fuel may flow from said fuel tank to said adaptation, at least one duct of said plurality of ducts sealably coupled at one end to said adaptation of said first valve and adapted to be coupled at its other end to a fuel intake port of an engine of said craft such that fuel may flow from said adaptation to said engine, said plurality of ducts further sealably interconnecting all said adaptations of said first valve in all devices of claim 1;

[c] a plurality of valves for regulating fluid flow, interposed in said ducts of said plurality of ducts, such that fluid communication may be limited to that between any combination of said fuel intake line, said fuel tank, and said first valve;

[d] a first indexing mechanism for releasably compressing said first storage member, selected from a group of indexing mechanisms consisting of electric motors, hydraulic motors, and mechanical cranks, said first indexing mechanism forming a relationship with said first storage member such that it may cause its compression, and;

[e] a second indexing mechanism for releasably compressing said second storage member, selected from a group of indexing mechanisms consisting of electric motors, hydraulic motors, and mechanical cranks, said second indexing mechanism forming a relationship with said second storage member such that it may cause its compression.

5. The device of claim 1, further comprising:

[a] a spring as said first storage member;

[b] a spring as said second storage member;

[c] a first access hole in a rear wall of said housing;

[d] a second access hole in a bottom wall of said housing;

[e] a first bushing, forming an attachment with said rear wall of said housing, positioned such that an opening in one end of said first bushing may communicate with at least a part of said first access hole;

[f] a second bushing, forming an attachment with said bottom wall of said housing, positioned such that an opening in one end of said second bushing may communicate with at least a part of said second access hole;

[g] a substantially rigid stabilizing first rod, a part thereof slidably disposed through said first access hole and through said opening of said first bushing, a further part thereof disposed within said housing and substantially parallel to a compression axis of said first storage member, an end of said first rod adapted to form a coupling with said first storage member such that said first storage member may be substantially prevented by said first rod from flexing away from said compression axis, and;

[h] a substantially rigid stabilizing second rod, a part thereof slidably disposed through said second access hole and through said opening of said second bushing, a further part thereof disposed within said housing and substantially parallel to said compression axis of said second storage member, an end of said second rod adapted to form a coupling with said second storage member such that said second storage member may be substantially prevented by said first rod from flexing away from said compression axis.

6. The device of claim 1, further comprising:

[a] an adaptation of said first valve capable of permitting and preventing fluid communication between any combination of said bag, a further first object, and a further second object;

[b] a first catheter as said first object, one opening thereof sealably coupled to said first valve, its free end adapted to form a substantially sealable coupling with a first part of a cardiovascular system of an organism such that blood may flow between said bag and said part of said cardiovascular system;

[c] a second catheter as said second object, one opening thereof sealably coupled to said first valve, its free end adapted to form a substantially sealable coupling with a second part of said cardiovascular system of said organism such that blood may flow between said bag and said part of said cardiovascular system, and;

[d] a programmable controller for controlling operation of said adaptation of said first valve, further forming a plurality of sensors for sensing and reporting to said controller imminence and conclusion of discharge of a bolus of blood from said first part of said cardiovascular system into said bag, said controller operably coupled to said adaptation of said first valve and adapted to operate according to a user defined algorithm.

7. A device utilizing, in part, elastically deformable members for releasably storing a pressurized fluid such that pressure in said fluid, when said fluid is not flowing, may be substantially the same across a range of deformation of said deformable members, comprising:

[a] a substantially rigid housing, forming left, right, top, bottom, front, and rear walls, wherein said top wall of said housing forms a first opening, said first opening beginning a predetermined distance from said left wall of said housing and extending a predetermined distance towards said right wall of said housing;

[b] a substantially rigid platform, disposed within said housing, said platform forming left, right, top, bottom, front and rear surfaces, at least a part of said left, right, front, and rear surfaces slidably conforming, respectively, to said left, right, front, and rear walls of said housing, said platform forming a longitudinal first groove from left to right on said top surface of said platform, said first groove adapted to slidably and retainably receive a tongue;

[c] a first partition, a part thereof vertically positioned within said housing, said first partition forming left, right, top, bottom, front, and rear surfaces, at least a part of said front and rear surfaces thereof slidably conforming to said front and rear walls of said housing, said first partition further forming a tongue at its lower end, said tongue retainably disposed in said first groove;

[d] a second groove, vertically positioned in said left surface of said first partition, said second groove adapted to slidably and retainably receive a tongue;

[e] a third groove, horizontally positioned in a superior part of said top wall of said housing, adapted to slidably and retainably receive a tongue;

[f] a second partition, in width substantially the same as the interior width of said housing as measured from said front wall to said back wall, said second partition forming at least one tongue slidably and retainably disposed in said third groove, further forming a tongue slidably and retainably disposed in said second groove;

[g] a first storage device for releasably storing mechanical energy, selected from among a class of mechanical energy storage devices using an elastically deformable material as a storage element or using compression of a gas as a storage element, disposed within said housing below said platform, further disposed such that it may releasably store mechanical energy from a force applied in its direction from said top surface of said platform;

[h] a second storage device for releasably storing mechanical energy, selected from among a class of mechanical energy storage devices using an elastically deformable material as a storage element or using compression of a gas as a storage element, disposed within said housing such that it may releasably store mechanical energy from a force applied in its direction by said first partition, said second storage device further forming substantially slidable interfaces with elements within said housing such that said second storage device may permit vertical movement by said first partition or forming at least one attachment and at least one slidable interface with at least one element within said housing such that said second storage device may permit vertical movement by said partition;

[i] a sealable second opening in said housing, disposed to provide entry to a partitioned area of said housing not containing either of said storage devices;

[j] a first valve for regulating flow of a fluid, sealably disposed in said second opening;

[k] a flexible and substantially nonpermeable bag adapted to contain a pressurized fluid, disposed within said housing and forming an opening thereinto sealably coupled to said first valve, and;

[l] a plurality of further openings in said housing, disposed and adapted such that they may relieve pressure accumulation in any fluid which is within said housing but which is external to fluid within said bag, and external to any parts of said first and second storage devices.

8. The device of claim 7, further comprising:

[a] a fourth groove, horizontally positioned and traversing left to right in a superior surface of said left wall of said housing, adapted to slidably and retainably receive a tongue;

[b] a fifth groove, horizontally positioned and traversing left to right in a superior surface of said right wall of said housing, adapted to slidably and retainably receive a tongue;

[c] a sixth groove, vertically disposed in said rear surface of said first partition, adapted to slidably and retainably receive a tongue, and;

[d] a third partition, resting athwart said right and left walls of said housing, forming a first tongue slidably and retainably disposed in said sixth groove, said third partition extending, when said second storage device is fully decompressed, to a position at least to said right wall of said housing, further forming a second tongue slidably and retainably disposed in said fourth groove, further forming a third tongue slidably and retainably disposed in said fifth groove.

9. The device of claim 7, further comprising:

[a] an adaptation of said first valve capable of permitting fluid communication between any combination of said bag and three further objects;

[b] a first access hole in said housing and a first self locking device for releasably locking said first storage device in a compressed position, said first self locking device disposed in part through said first access hole, and a second access hole in said housing and a second self locking device for releasably locking said second storage device in a compressed position, said second self locking device disposed in part through said second access hole, both said self locking devices further disposed and adapted such that they may, respectively, releasably lock said first and second storage devices in a compressed position;

[c] a first duct, a first end thereof sealably coupled to said first valve, further forming a plurality of heat dissipation fins along at least a part of exterior of said first duct;

[d] a tank adapted to contain a refrigerant solution, forming a first, second, and third opening, sealably coupled at said first opening to a free end of said first duct;

[e] a second valve, sealably disposed in said second opening of said tank;

[f] a second duct, a first end thereof sealably coupled to said second valve, a free end of said second duct sealably coupled to said first valve;

[g] a desiccant, disposed within said second duct;

[h] a third duct, a first end thereof sealably coupled to said first valve, a part thereof forming an expansion valve, a free end of said third duct sealably disposed through said third opening of said tank and terminating within said tank and forming a plurality of holes;

[i] a fourth opening in said housing and a sealable fourth opening in said tank;

[j] a sensor for sensing temperature and pressure in said bag and in said tank, a part thereof disposed through said fourth opening of said housing and a further part thereof sealably disposed through said fourth opening of said tank, further forming a data conduit adapted to transmit data representing said temperatures and pressures to a controller, and;

[k] a programmable controller for controlling, based on an algorithm using data input from said sensor, operation of said first and second valves, said adaptation of said first valve, said self locking device, and for controlling operations of heat sources which may be applied to said tank and to said second duct, said controller coupled to said conduit of said sensor such that it may receive said data input and forming a plurality of adaptations for controlling said operations.

10. The device of claim 7, further comprising:

[a] a third opening in said housing, disposed in at least a part of at least one wall thereof, and;

[b] a rigid, substantially transparent plate, disposed to substantially close said opening and forming an attachment with said housing, such that said device may facilitate educational use.

11. The device of claim 7, further comprising:

[a] an adaptation of said first valve capable of permitting and preventing fluid communication between any combination of said bag, a further first object, and a further second object;

[b] an air compressor for proximally compressing said first and second storage devices, said air compressor forming an output port as said first object, sealably coupled to said adaptation of said first valve such that it may forcibly introduce air into said bag;

[c] at least one duct, as said second object, a first end thereof sealably coupled to said first valve, said duct forming an expansion valve at a predetermined distance from a free end thereof such that escaping air may provide a cooling effect relative to ambient air, said free end of said duct adapted to be disposed such that it may direct escaping air at a part of a computing apparatus or at ancillary parts thereof requiring cooling;

[d] an access hole in a wall of said housing;

[e] a sensor for sensing pressure and volume of air remaining in said bag, disposed in part through said access hole, further forming a first data conduit adapted to transmit said volume sensed in data form to a controller, and;

[f] a programmable controller for controlling, using an algorithm based on data input from said sensor and from said computing apparatus, operation of said adaptation of said first valve and of said compressor and forming two adaptations therefor and coupled respectively thereto, said controller further coupled to said first data conduit, further forming a second data conduit adapted to be coupled to a part of said computing apparatus which may furnish temperature data relating to parts of said computing apparatus requiring cooling and data relating to the operational state of said computing apparatus.

12. The device of claim 7, further comprising:

[a] an adaptation of said first valve capable of permitting and preventing fluid communication between any combination of said bag, a further first object, and a further second object;

[b] a first relief valve, sealably disposed in said first valve such that pressure in said bag may be prevented from exceeding a predetermined level;

[c] a first duct as said first object, its proximal end sealably coupled to said first valve;

[d] a sealable reservoir for containing a fluid, forming sealable first, second, and third openings, sealably coupled at said first opening thereof to an end of said first duct, said reservoir fabricated of such material as may withstand repeated heating at a temperature sufficient to force at least a part of said fluid when present into said bag to at least partially compress said first and second storage devices;

[e] a second relief valve, sealably disposed in said second opening of said reservoir such that pressure in said reservoir may be prevented from exceeding a predetermined level;

[f] a second duct, a first end thereof sealably coupled to said third opening of said reservoir and extending to a position within said reservoir where it may contact said fluid, when present within said reservoir;

[g] a fluid driven actuator, forming a fluid intake port and a fluid output port, said output port sealably coupled to a free end of said second duct, said actuator further forming a shaft which may be driven by said actuator, said shaft forming an adaptation which may operatively interface with a further work object, and;

[h] a third duct as said second object, a first end thereof sealably coupled to said intake port of said actuator, a free end thereof sealably coupled to said first valve.

13. A device utilizing, in part, an elastically deformable member for releasably storing a pressurized fluid such that pressure in said fluid, when said fluid is not flowing, may be substantially the same across a range of deformation of said deformable member, comprising:

[a] a substantially rigid housing, forming a hollow geometric solid having a front portion, rear wall, left wall, right wall, top wall, and bottom wall;

[b] a sealable first opening, disposed in said front portion of said housing;

[c] a first valve for regulating flow of a fluid, sealably disposed in said first opening;

[d] a flexible and substantially nonpermeable bag, disposed within said housing;

[e] a second opening, disposed in said bag and sealably coupled to said first valve;

[f] a first groove, disposed within said housing and in said left wall of said housing and traversing towards said rear wall of said housing;

[g] a second groove, disposed within said housing and in said right wall of said housing and traversing towards said rear wall of said housing;

[h] an expandable partition for forming a substantially rigid partition within said housing in a substantially slidable and sealable manner, disposed within said housing between said bag and said rear wall of said housing, said partition forming at its left end a first tongue retainably and slidably disposed in said first groove, forming at its right end a second tongue retainably and slidably disposed in said second groove such that movement of said partition towards the nominal rear may result in expansion of said partition while substantially maintaining a seal between it and said housing;

[i] a storage device for releasably storing mechanical energy, selected from among a class of mechanical energy storage devices using an elastically deformable material as a storage element or using compression of a gas as a storage element, disposed within said housing between said partition and said rear wall of said housing, further disposed such that it may releasably store mechanical energy from a force applied in its direction by said partition, said storage device further forming a substantially slidable interface with a part of said partition such that said storage device may permit horizontal movement by said partition, and;

[j] a plurality of openings, disposed in said walls of said housing such that they may relieve accumulating gas pressure external to said bag and external to said storage device.

14. The device of claim 13, further comprising:

[a] an adaptation of said first valve permitting sealable coupling thereto of a second bag, later recited in this claim, said adaptation further specialized to permit and prevent fluid communication between said bag and said second bag, and to permit and prevent individual and simultaneous fluid communication between said bag, said second bag, and locations exterior to said housing, in any combination thereof, such that different fluids may be releasably stored in and dispensed from said bag and said second bag, jointly or severally, and;

[b] a flexible and substantially nonpermeable second bag, disposed within said housing between said partition and said front portion of said housing, said second bag forming an opening sealably coupled to said adaptation of said first valve.

15. The device of claim 13, further comprising:

[a] an adaptation of said first valve permitting it to be operated by an electrical impulse in a manner as may permit and prevent fluid communication between said bag and a first object, and as may permit and prevent fluid communication between said bag and a second object;

[b] a first duct as said first object, sealably coupled at a first end thereof to said adaptation;

[c] an electrically operated sealable fluid impeller, a fluid output port thereof sealably coupled to a free end of said first duct;

[d] a fluid reservoir, forming a sealable first and second opening thereinto, sealably coupled at said first opening thereof to a fluid intake port of said impeller;

[e] a second duct as said second object, sealably coupled at a first end thereof to said adaptation;

[f] a fluidically operated electrical generator adapted to furnish starting power to a combustion engine, a fluid intake port thereof sealably coupled to a free end of said second duct;

[g] a third duct as said second object, sealably coupled at a first end thereof to a fluid output port of said generator and sealably coupled at a free end thereof to said second opening of said reservoir;

[h] an electrical conduit, coupled to said adaptation of said first valve such that it may conduct said electrical impulse;

[i] a further opening into said housing, and;

[j] an electrically operated indexing device for releasably compressing said storage device, a part thereof passing through said further opening of said housing to a position where it may act to compress said storage device.

16. The device of claim 13, further comprising:

[a] a fluid reservoir, forming sealable first and second openings thereinto, said first opening thereof adapted to slidably and sealably receive a piston, said second opening thereof sealably coupled to said first valve;

[b] a piston, a first end thereof sealably and slidably disposed through said first opening of said reservoir, a free end thereof forming an adaptation which may be coupled to, or may form responsive contact with, a part of an object which may experience mechanical shock or stress, such that said piston may respond to said shock or stress by forcibly progressing further into said reservoir and, when said reservoir and said bag contain fluid in a predetermined quantity and said first valve is open, may thereby proximally cause displacement of said storage device, and;

[c] a duct, sealably coupled at a first end thereof to said second opening of said reservoir, and sealably coupled at a free end thereof to said first valve.

17. The device of claim 13, further comprising:

[a] a first adaptation of said first valve, sealably coupled to said first valve and capable of forming a sealable coupling with an output line of an air pump used to supply compressed air to an air tank of an air driven conveyance, such that said first adaptation may permit and prevent air flow from said pump into said bag, and;

[b] a second adaptation of said first valve, sealably coupled to said first valve and capable of forming a sealable coupling with an air supply port of an air driven actuator for providing motive force for said conveyance, such that said second adaptation may permit and prevent air flow from said bag into said actuator.

18. The device of claim 13, further comprising:

[a] an adaptation of said first valve permitting it to be operated by a controller in a manner as may permit and prevent fluid communication between said bag and a catheter later recited in this claim, and as may permit and prevent fluid communication between said bag and a second catheter later recited in this claim;

[b] a first catheter, a first opening thereof sealably coupled to said adaptation of said first valve, a free opening of said first catheter adapted to form a substantially sealable coupling with a first part of a cardiovascular system of an organism such that said first catheter may conduct blood from said part of said cardiovascular system into said bag;

[c] a second catheter, a first opening thereof sealably coupled to said adaptation of said first valve, a free opening of said second catheter adapted to form a substantially sealable coupling with a second part of a cardiovascular system of an organism such that said second catheter may conduct blood from said bag to said second part of said cardiovascular system;

[d] a controller for controlling operation of said adaptation of said first valve, further forming a plurality of sensors for sensing and reporting to said controller an imminence and conclusion of a discharge of a bolus of blood from said first part of said cardiovascular system into said bag, said controller operably coupled to said adaptation of said first valve and adapted to operate according to a user defined algorithm.

19. The device of claim 13, further comprising:

[a] a wheel rim of a conveyance, said rim having a valve therein for adding or discharging air from a tire mounted on said rim, and forming at least one sealable opening therethrough which may provide access to an interior of a tire when mounted thereon;

[b] an adaptation of said first valve of claim 13 capable of selectively permitting and preventing fluid communication between said bag and a duct later recited in this claim, and between said bag and a second valve for regulating flow of a fluid, said second valve later recited in this claim, said adaptation of said first valve of claim 13 further capable of automatically permitting fluid communication with said duct when pressure in said duct is below a predetermined level;

[c] a duct, sealably coupled at one end to said adaptation, and sealably coupled at its other end to said sealable opening in said rim;

[d] a second valve for regulating flow of a fluid, sealably coupled at one end to said adaptation of said first valve of claim 13, such that air may be pumped therethrough into said bag, and;

[e] a fastener for attaching said housing to said rim, said fastener coupled to said rim.

* * * * *